United States Patent
Naoi

(10) Patent No.: US 7,540,646 B2
(45) Date of Patent: Jun. 2, 2009

(54) LIGHT GUIDE ELEMENT, LIGHT GUIDE UNIT, BACKLIGHT APPARATUS AND LIGHT SOURCE APPARATUS

(75) Inventor: Yuki Naoi, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 172 days.

(21) Appl. No.: 11/657,377

(22) Filed: Jan. 24, 2007

(65) Prior Publication Data

US 2007/0177486 A1    Aug. 2, 2007

(30) Foreign Application Priority Data

| Jan. 31, 2006 | (JP) | ............................ 2006-022472 |
| Jan. 31, 2006 | (JP) | ............................ 2006-022473 |
| Mar. 6, 2006 | (JP) | ............................ 2006-059377 |
| Mar. 6, 2006 | (JP) | ............................ 2006-059378 |
| Jun. 9, 2006 | (JP) | ............................ 2006-161187 |
| Jun. 9, 2006 | (JP) | ............................ 2006-161188 |

(51) Int. Cl.
    *G02B 6/10* (2006.01)
(52) U.S. Cl. ...................... 362/558; 362/551; 385/31; 385/39; 385/43; 349/62; 349/65
(58) Field of Classification Search ............... 362/30, 362/561, 608, 610, 611, 612, 613, 615, 616, 362/621, 625; 349/57, 61, 62, 63, 65
    See application file for complete search history.

(56) References Cited

U.S. PATENT DOCUMENTS

| 5,461,547 | A | * | 10/1995 | Ciupke et al. | ............... 362/617 |
| 5,926,601 | A | * | 7/1999 | Tai et al. | ..................... 385/146 |
| 6,648,485 | B1 | * | 11/2003 | Colgan et al. | ............... 362/600 |
| 7,052,168 | B2 | * | 5/2006 | Epstein et al. | ............. 362/625 |
| 7,377,678 | B2 | * | 5/2008 | Huang et al. | ................ 362/608 |

FOREIGN PATENT DOCUMENTS

JP    2003-121840    4/2003

* cited by examiner

*Primary Examiner*—Hargobind S Sawhney
(74) *Attorney, Agent, or Firm*—Cohen Pontani Lieberman & Pavane LLP

(57) ABSTRACT

The present invention provides a light guide element, a light guide unit, a backlight apparatus and a light source apparatus. The light guide element is provided for guiding a light flux from a light source into a light guide plate, and the light guide element includes: an incident surface; an emitting surface; a top surface and a base surface, in which one of the top surface and the base surface inclines to the other. The light guide element further includes a structure in a light leakage reducing shape arranged on at least one of the top surface and the base surface, which reduces an amount of light to be emitted from the surfaces of the light guide element excluding the emitting surface.

27 Claims, 32 Drawing Sheets

FIG. 3
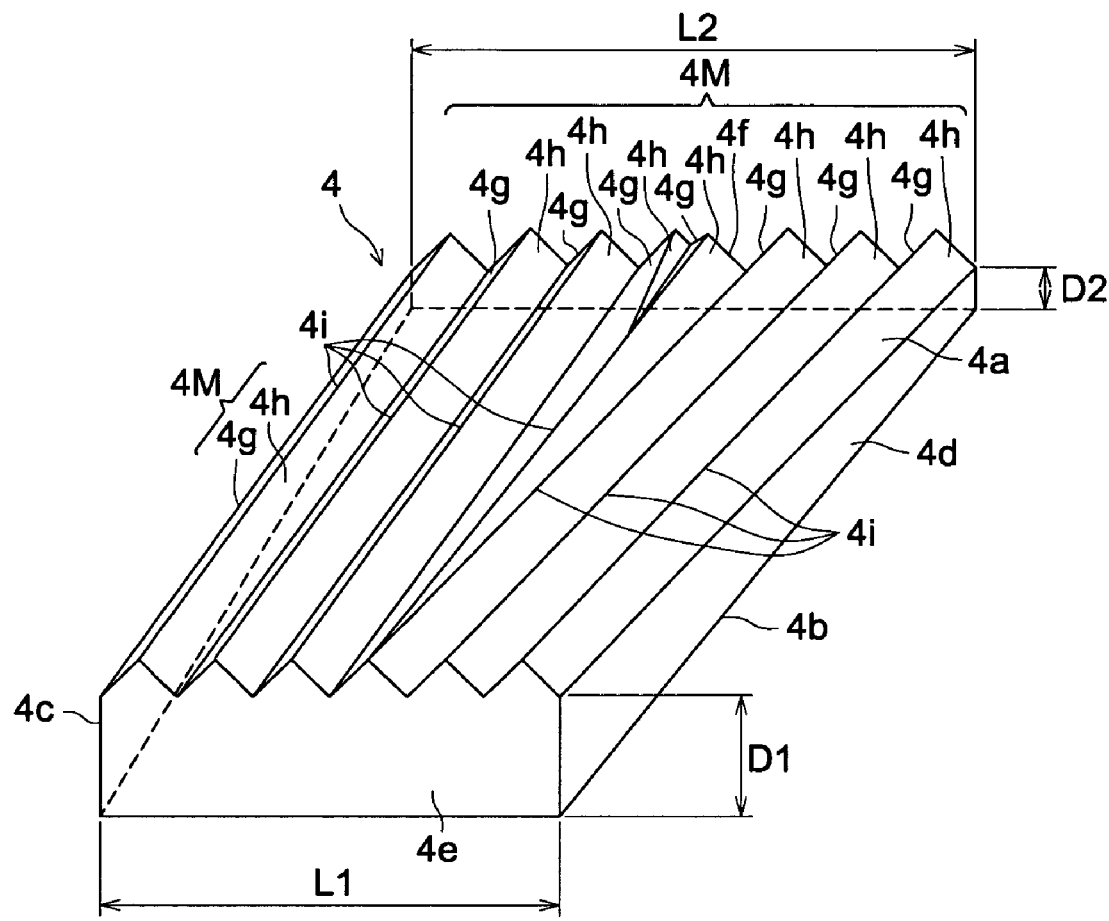
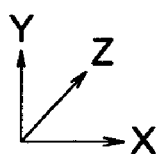

FIG. 4
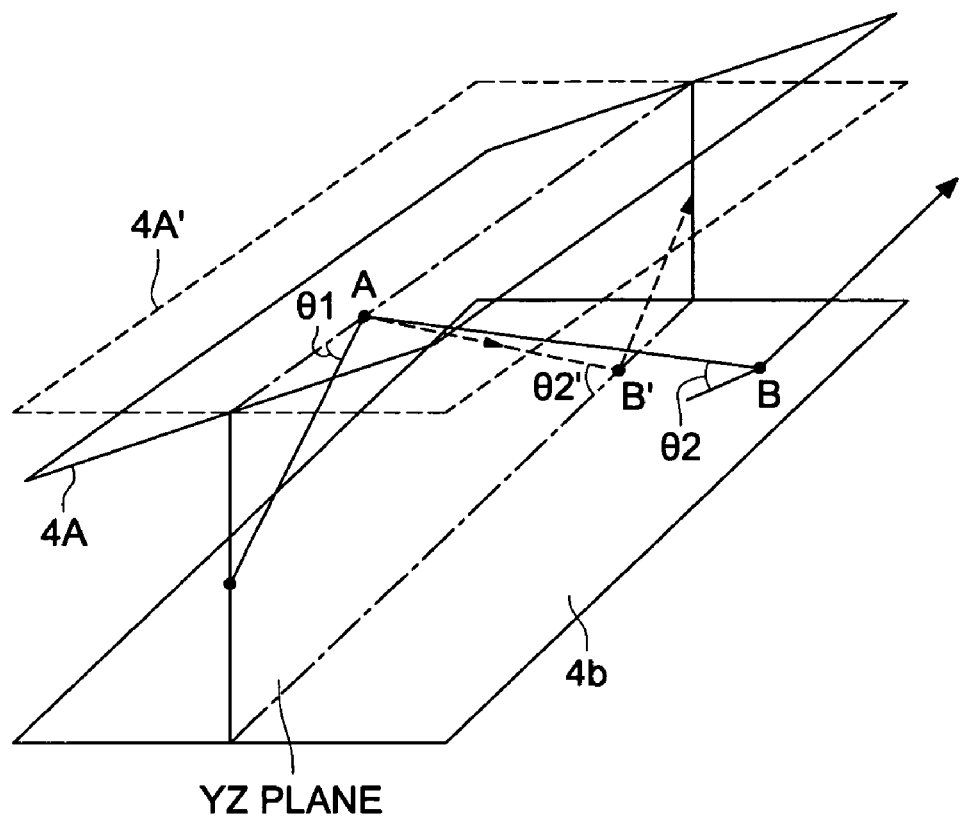
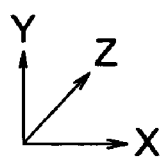

FIG. 9 ( a )
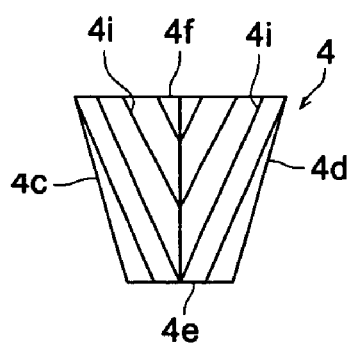
FIG. 9 ( b )
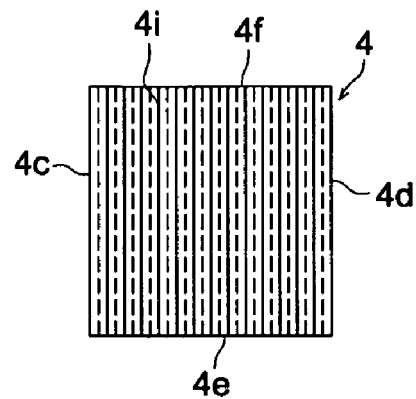
FIG. 9 ( c )
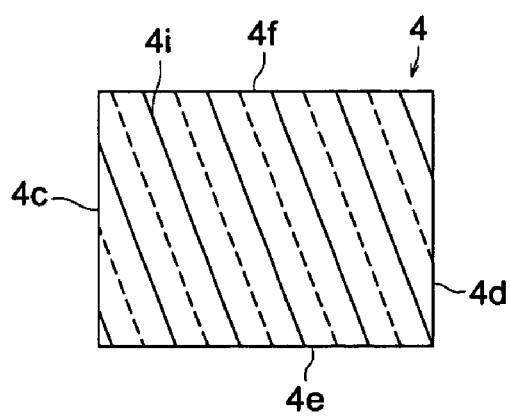
FIG. 9 ( d )
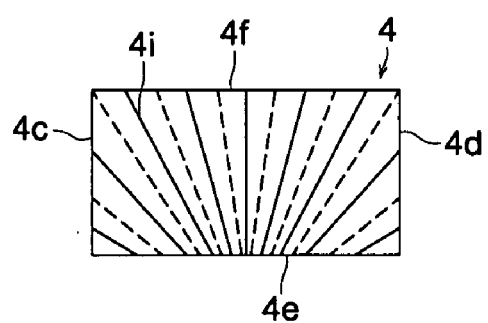
FIG. 9 ( e )
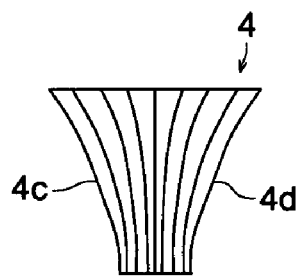
FIG. 9 ( f )
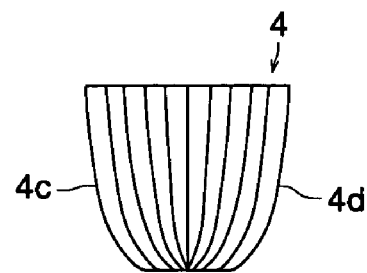

FIG. 31
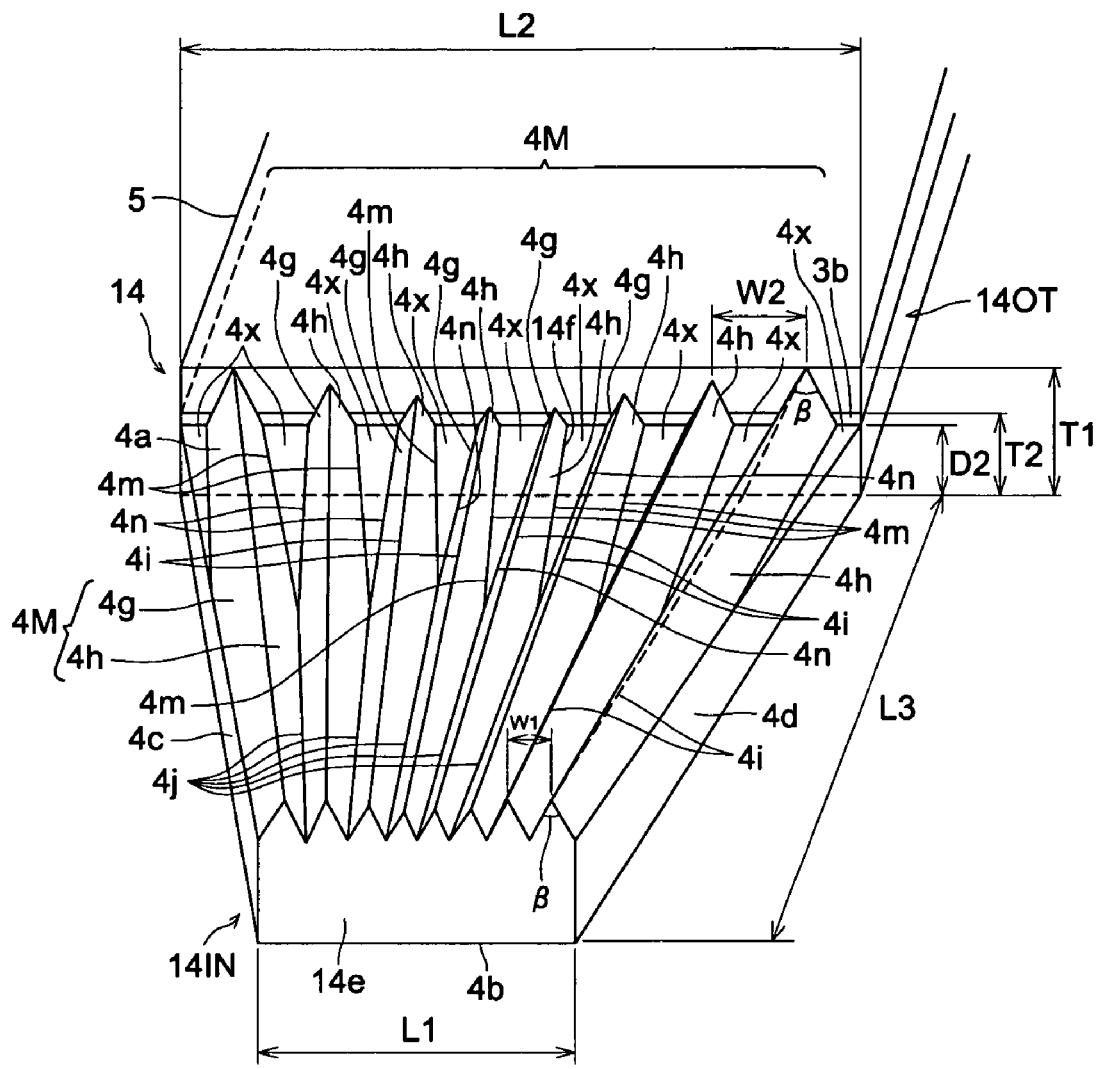
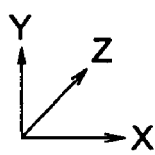

LIGHT GUIDE ELEMENT, LIGHT GUIDE UNIT, BACKLIGHT APPARATUS AND LIGHT SOURCE APPARATUS

This application is based on Japanese Patent Application Nos. 2006-022472 filed on Jan. 31, 2006, 2006-022473 filed on Jan. 31, 2006, 2006-059377 filed on Mar. 6, 2006, 2006-059378 filed on Mar. 6, 2006, 2006-161187 filed on Jun. 9, 2006, and 2006-161188 filed on Jun. 9, 2006 in Japanese Patent Office, the entire content of which is hereby incorporated by reference.

TECHNICAL FIELD

The present invention relates to a light guide element, a light guide unit, a backlight apparatus and a light source apparatus, and in particular, to a light guide element and a light guide unit both for guiding light to a light guide plate from a light source, and to a backlight apparatus and a light source apparatus each having the light guide element or the light guide unit.

BACKGROUND

In a liquid crystal display device that is provided on a cell-phone or a personal digital assistance, a backlight apparatus for illuminating a display portion to be bright is used. This backlight apparatus is composed of a light guide plate to be arranged on a back face of a liquid crystal panel representing a display section; a light source such as a light emitting element (which is LED) and a cold-cathode tube to be arranged on the side of the light guide plate; and a light guide element for guiding light coming from the light source to the light guide plate. This backlight apparatus equipped with the aforesaid structure has an advantageous point that the total apparatus can be made to be thin, because light enters through a side face of the light guide plate, and light sources are not required to be arranged in the direction of a thickness of the light guide plate.

In recent years, liquid crystal display devices are installed in a thin type cell-phone and a digital camera in many cases, and a demand for a small-sized backlight apparatus has become strong. Responding to this trend, a light guide plate is becoming thinner. However, there are actual circumstances that it is difficult to reduce the size of LED, which is used as a light source, to the same extent as a thickness of the light guide plate. On the other hand, directivity in the light-emitting property of LED is generally low, and some outgoing beams are diverged radially at a wide angle. Therefore, how to cause the outgoing beam emitted from LED to enter the thin light guide plate efficiently is a problem.

Japanese Patent Publication Open to Public Inspection No. 2003-121840 discloses a backlight apparatus provided with a light-receiving section on which an inclined plane that is inclined at an angle of 45° or less upward from the main body portion of the light guide plate is formed. Further, it discloses a technology to attain a thin backlight apparatus by providing a light-receiving surface inclined to be substantially perpendicular to the inclined plane, and by inclining so that a light-emitting surface of the light source may become to be parallel with this light-receiving surface.

In the case of the former, however, a reflecting film is coated on a slope for increasing the reflectance on the slope, because a beam entering the slope is not always subjected to total reflection. Thus, the manufacturing process for the light guide plate is made to be complicated by the process of coating of the reflecting film. Further, there is also a problem that the utilization efficiency of light is lowered, because no small amount of light is absorbed by the reflecting film due to the property of the reflecting film. Further, in the case of the latter, there is also a problem that the utilization efficiency of light is lowered when a further thinner main body portion of the light guide plate is provided and the incident light reflects larger times at the light-receiving section in such a structure, although the technology in the case of the latter can contribute to provide the thinner backlight apparatus.

SUMMARY

To solve the above problems, an object of the present invention is to provide a light guide element and a light guide unit wherein light emitted from the light source can be guided to a thin light guide plate, and yet the utilization efficiency of light can be enhanced, and a backlight apparatus and a light source apparatus each employing the aforesaid light guide element and the light guide unit.

A light guide element according to the present invention is provided for being arranged between a light source and a light guide plate and for guiding a light flux from the light source into the light guide plate. The light guide element includes: an incident surface for receiving an incident light flux from the light source; an emitting surface for emitting a light flux to the light guide plate; a top surface and a base surface both facing each other; and a structure in a light leakage reducing shape arranged on at least one of the top surface and the base surface. The light leakage reducing shape reduces an amount of light emitted from surfaces of the light guide element excluding the emitting surface out of the incident light emitted from the incident surface.

Further, a light guide unit according to the present invention includes an incident section for receiving an incident light flux from a light source; and an emitting section for emitting the incident light flux outside of the light guide unit. The incident section and the emitting section are integrally formed in one body. The incident section includes an incident surface for receiving an incident light flux from the light source; a boundary plane defining a border between the first incident section and the emitting section, and transmitting a light flux which travels from the incident section to the emitting section; a top surface and a base surface both facing each other; and a structure in a light leakage reducing shape arranged on at least one of the top surface and the base surface. The light leakage reducing shape reduces an amount of light emitted from surfaces of the incident section excluding the boundary plane out of the incident light emitted from the incident surface. The emitting section includes an incident surface and an emitting surface extending in a direction perpendicular to the incident surface of the emitting section.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIG. 3 is a schematic perspective view of light guide element 4;

FIG. 4 is a diagram for illustrating a light leakage reducing shape;

Figure 6:
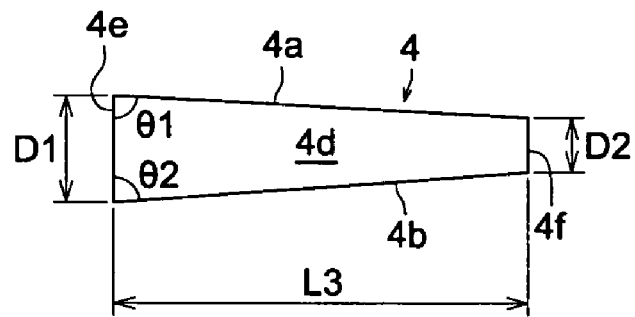
Figure 6:
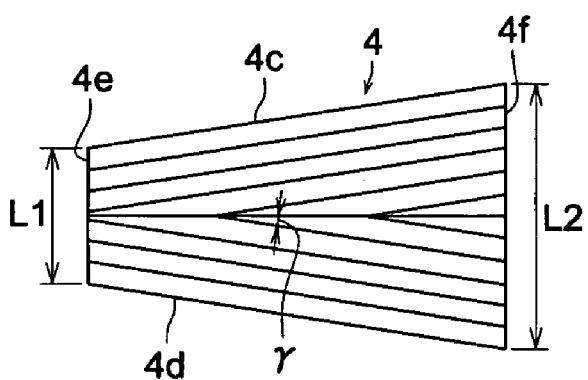
Figure 6:
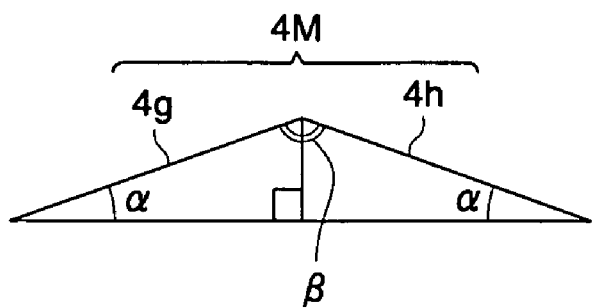
Figure 7:
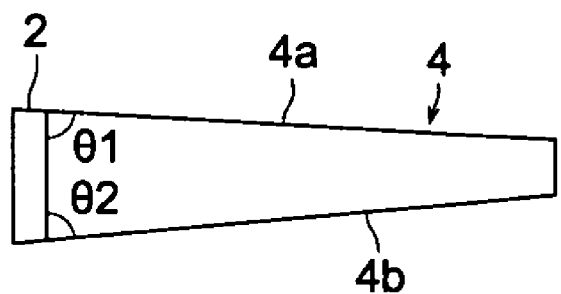
Figure 7:
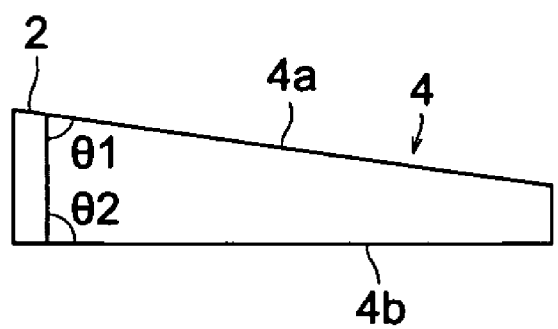
Figure 7:
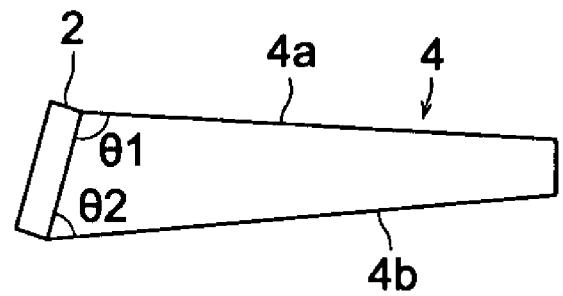
Figure 8:
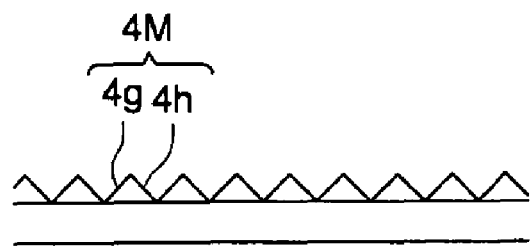
Figure 8:
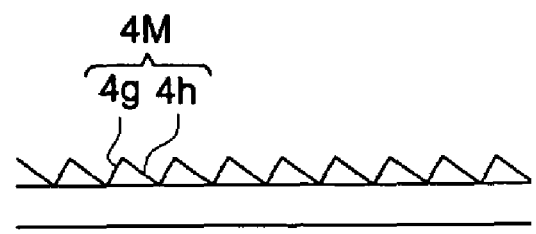
Figure 8:
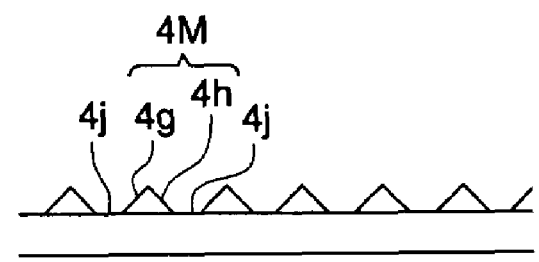
Figure 8:
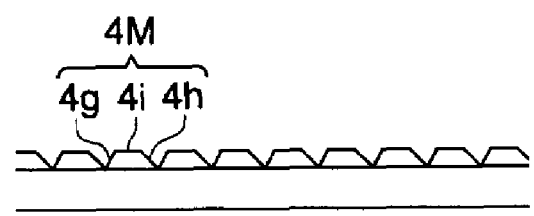
Figure 8:
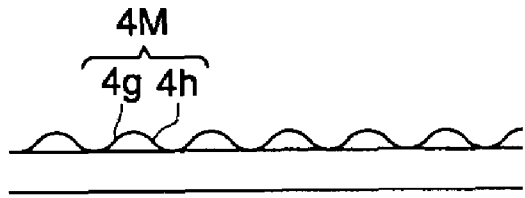
Figure 10:
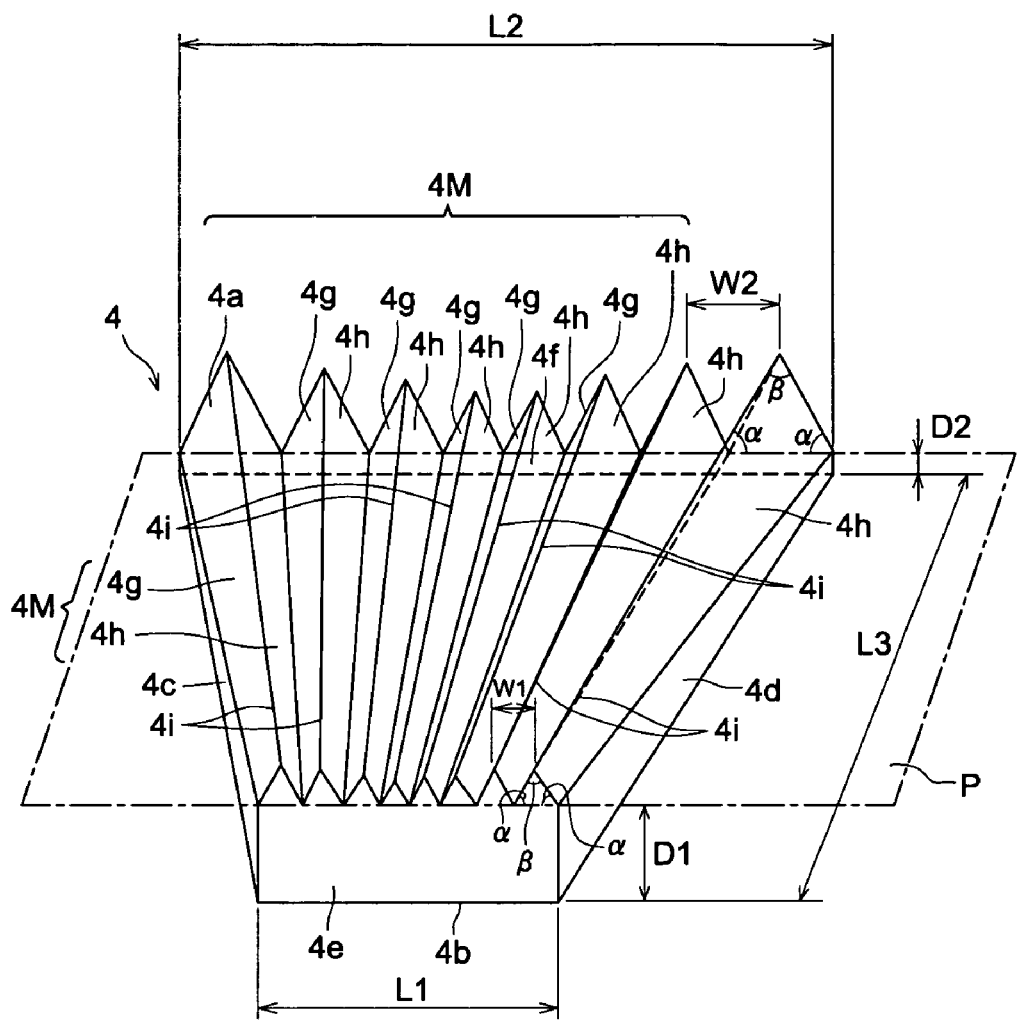
Figure 11:
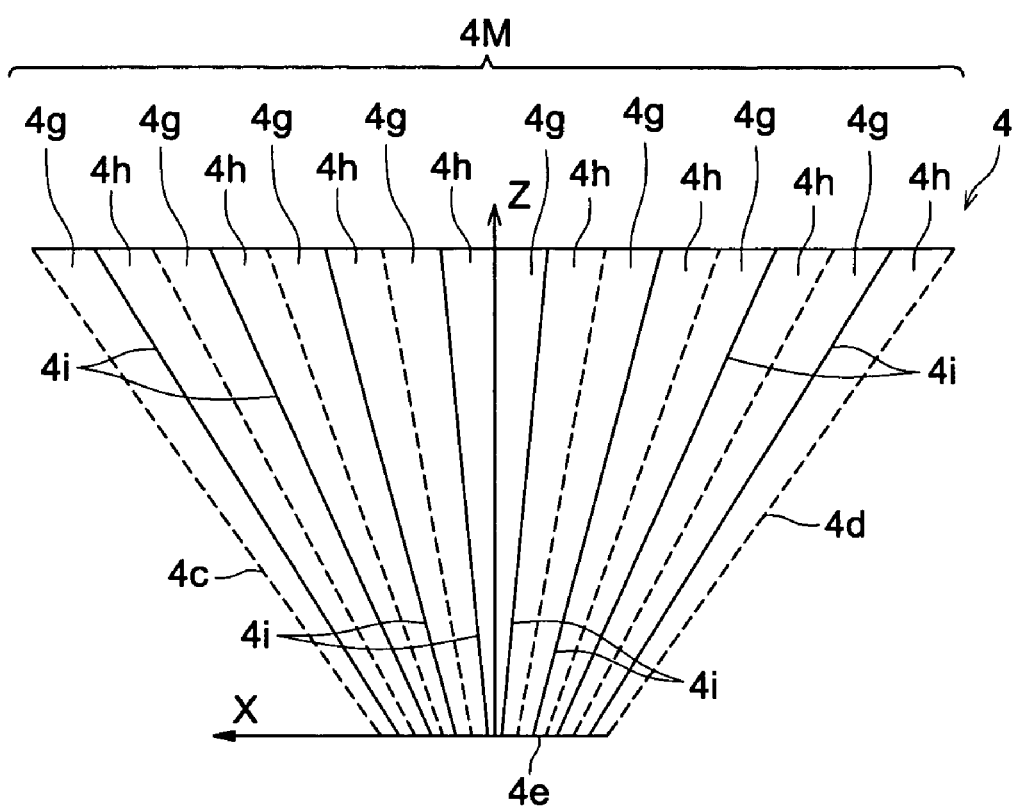
Figure 12:
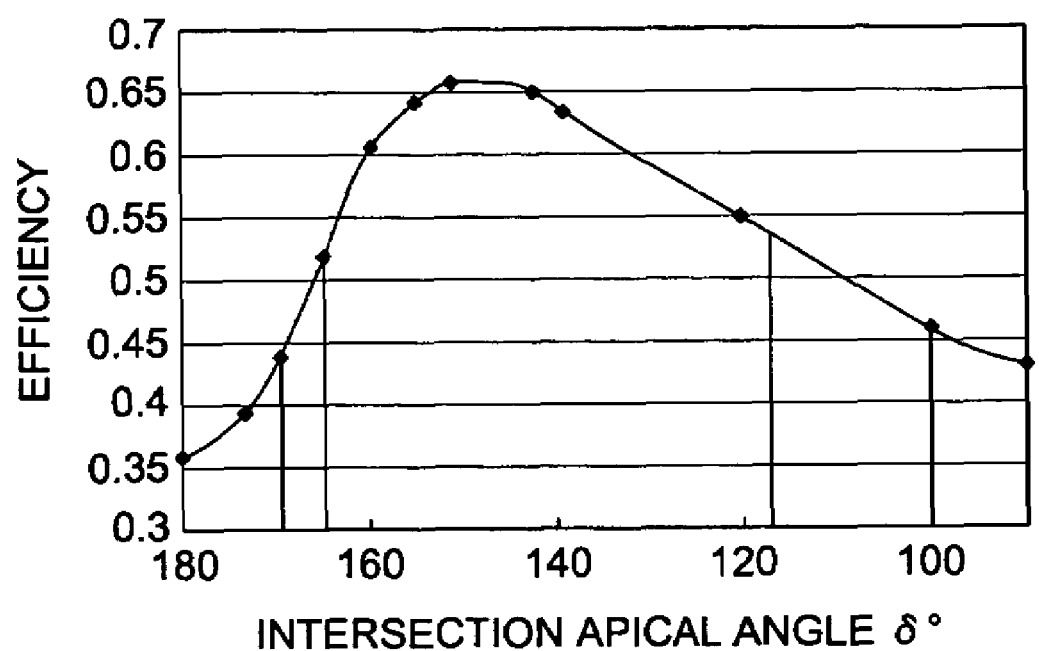
Figure 13:
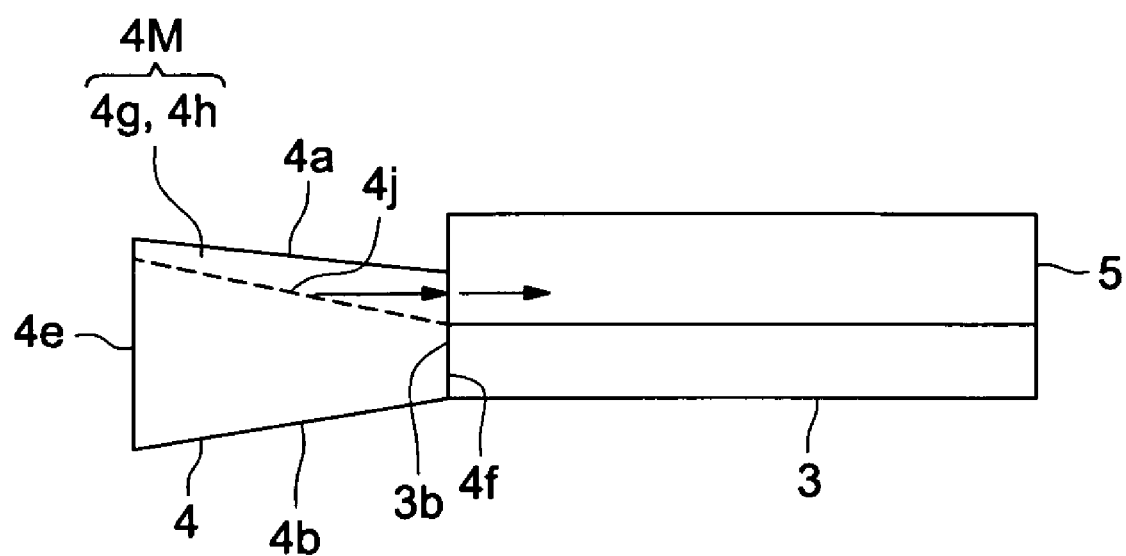
Figure 14:
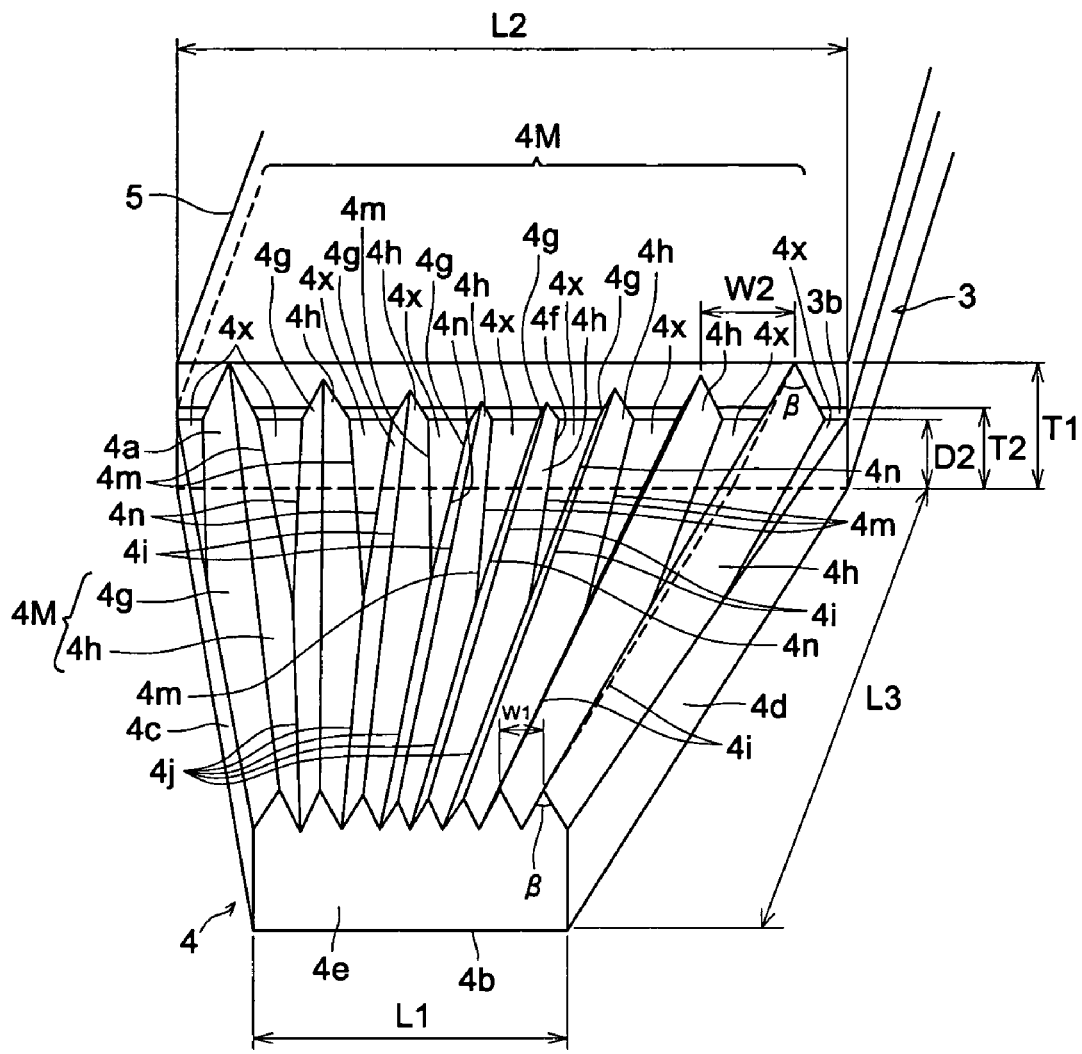
Figure 15:
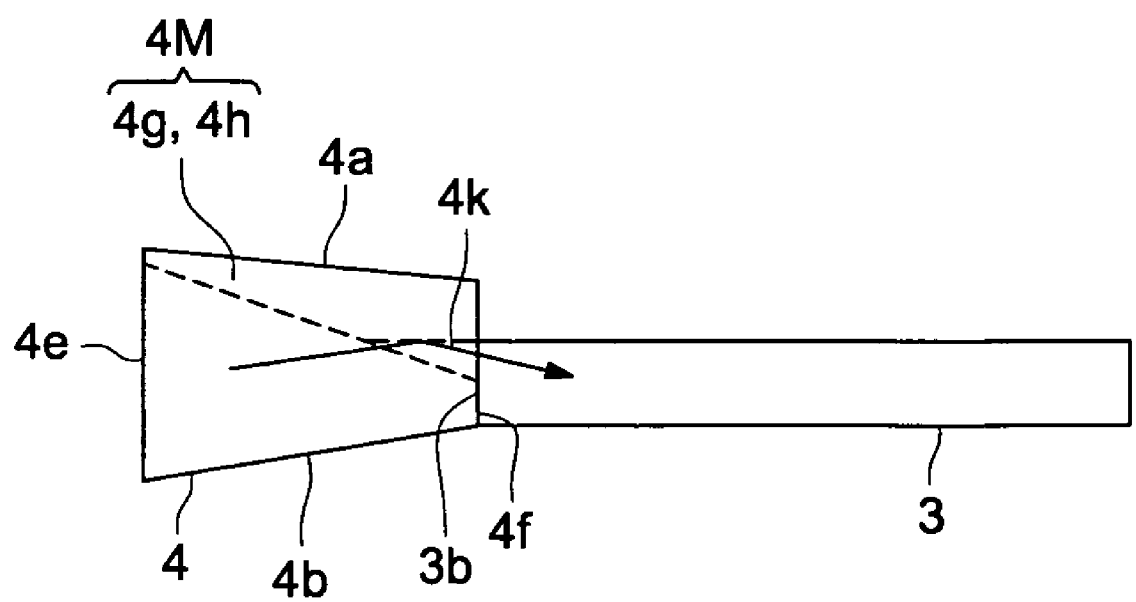
Figure 16:
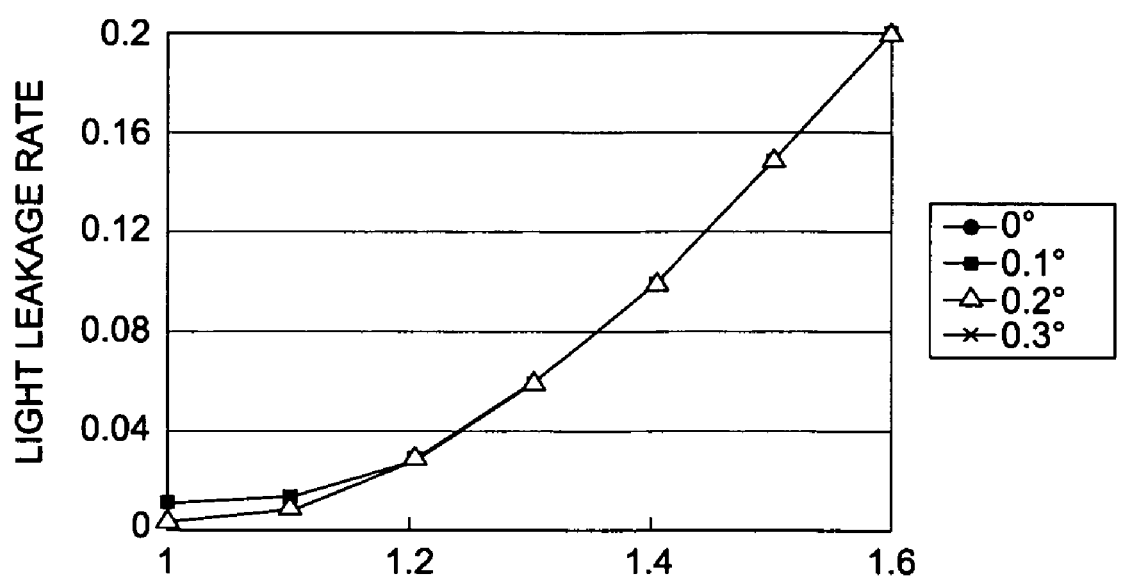

Each of FIGS. 5(*a*) and 5(*b*) is a diagram showing the results of simulations conducted by the inventor of this invention;

FIG. 6(*a*) is a side view of light guide element 4, FIG. 6(*b*) is a top view of light guide element 4 and FIG. 6(*c*) is an enlarged diagram wherein a pair of slopes 4*g* and 4*h* are viewed in the direction toward the emitting surface side;

Each of FIGS. 7(*a*)-7(*c*) is a side view of a light guide element relating to the variations of the first embodiment;

Each of FIGS. 8(*a*)-8(*e*) is a diagram showing an enlarged prism of a light guide element relating to the variations of the first embodiment;

Each of FIGS. 9(*a*)-9(*f*) is a top view of a light guide element relating to the variations of the first embodiment;

FIG. 10 is a perspective view of a light guide element relating to the second embodiment;

FIG. 11 is a top view of the light guide element shown in FIG. 10;

FIG. 12 is a diagram showing the results of simulations conducted by the inventor of this invention;

FIG. 13 is a side view showing light guide element 4 and light guide plate 3 relating to the second embodiment;

FIG. 14 is a perspective view showing light guide element 4 and light guide plate 3 relating to the third embodiment;

FIG. 15 is a diagram wherein the third embodiment shown in FIG. 14 is viewed from the side;

FIG. 16 is a graph showing the results of simulations conducted by the inventor of this invention.

Figure 17:
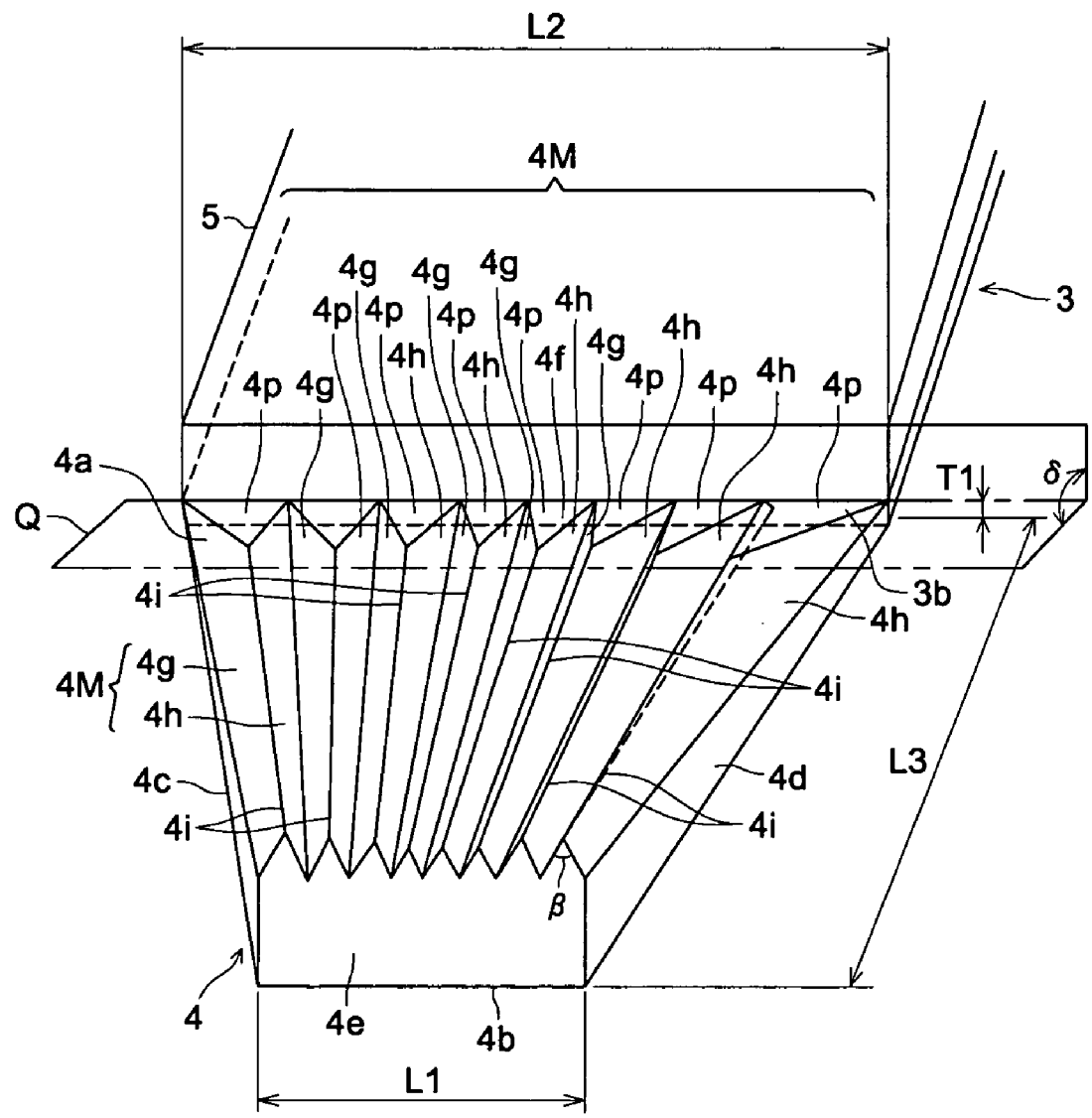
Figure 18:
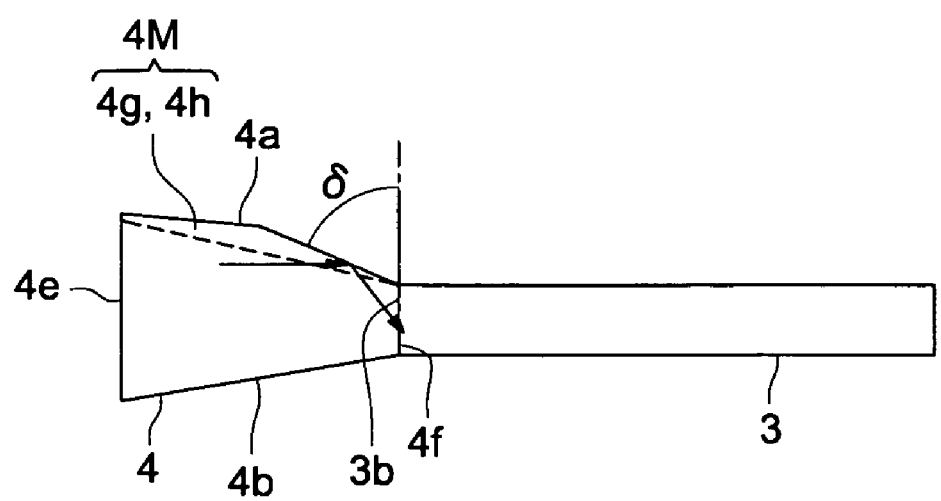
Figure 20:
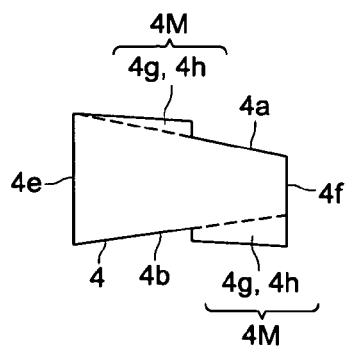
Figure 22:
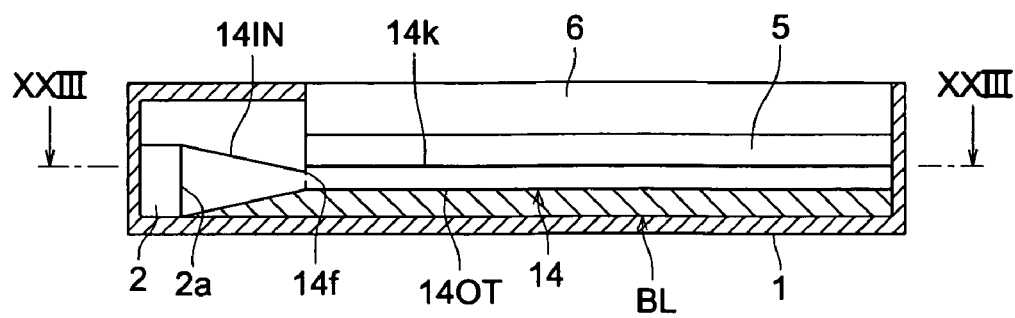
Figure 23:
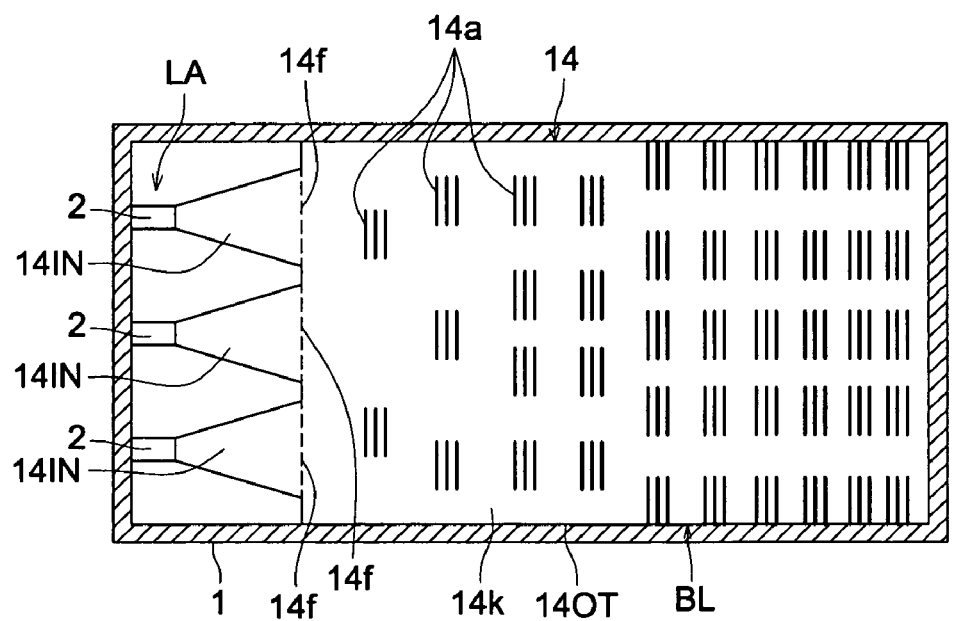
Figure 24:
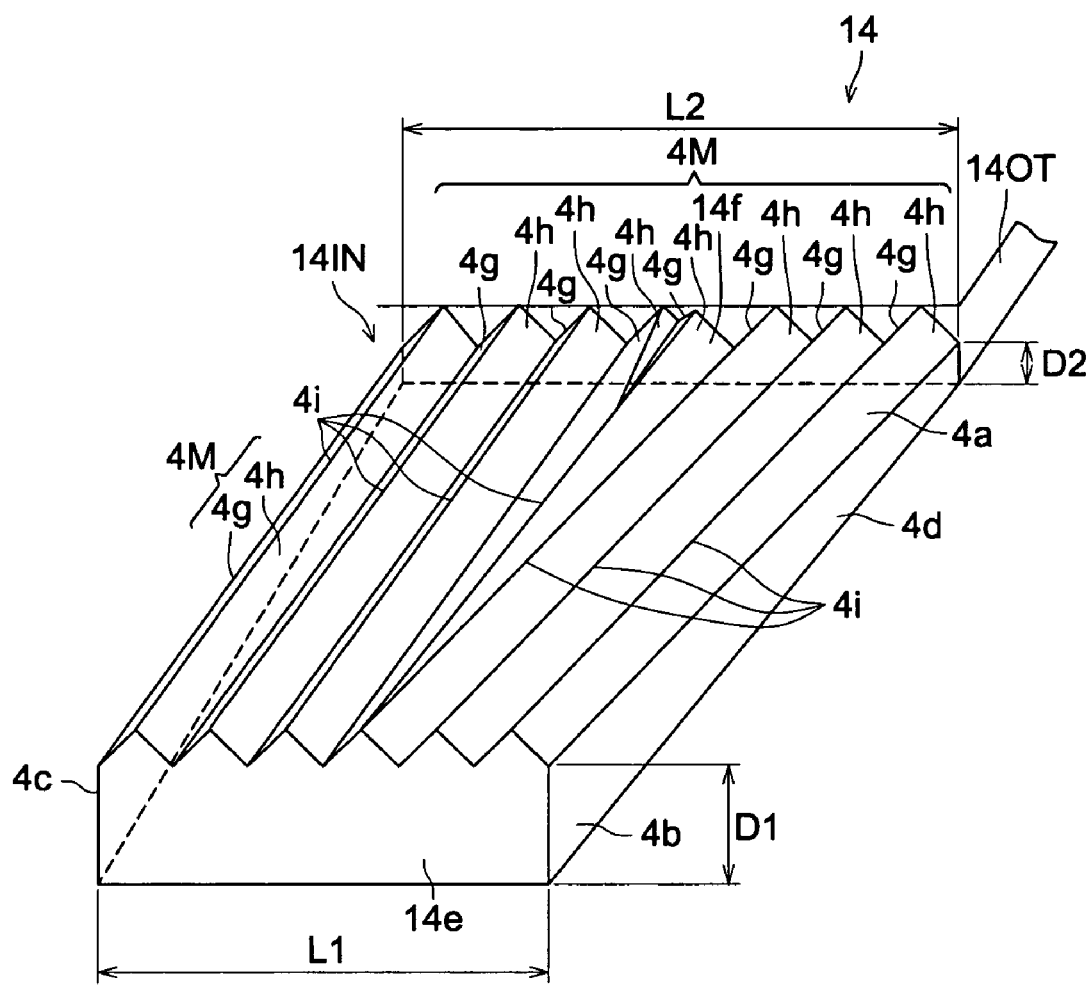
Figure 25:
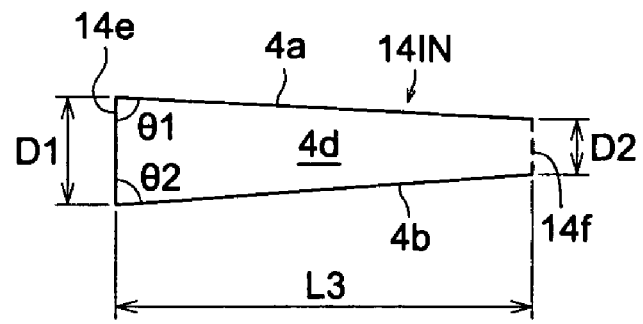
Figure 25:
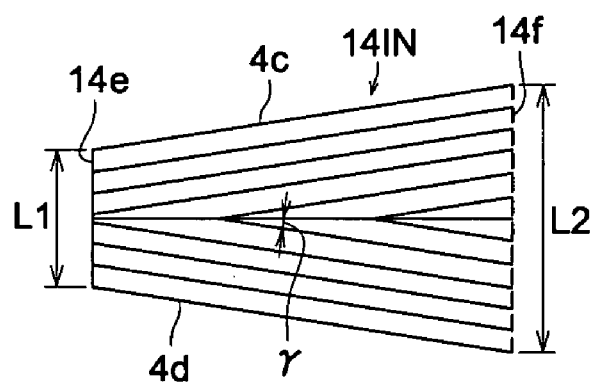
Figure 25:
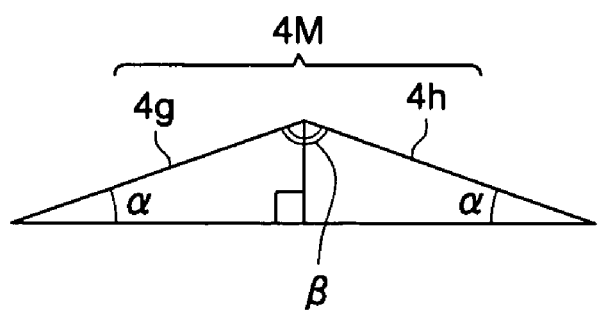
Figure 26:
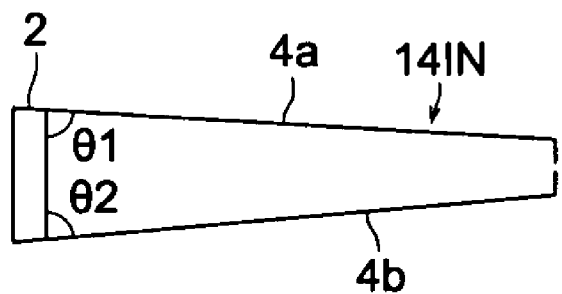
Figure 26:
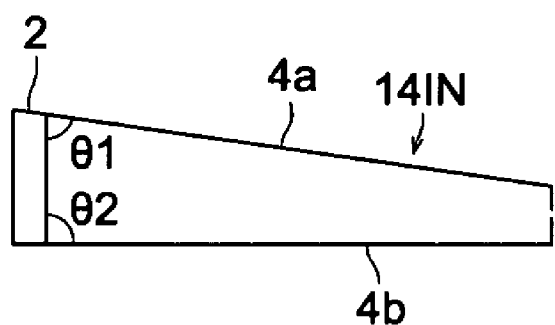
Figure 26:
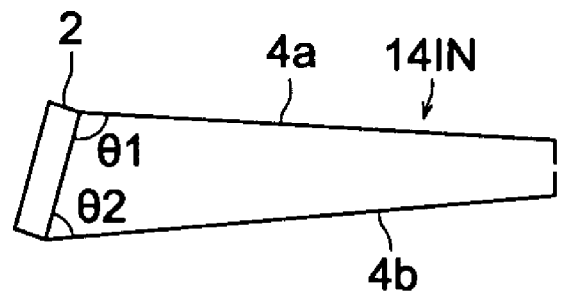
Figure 28:
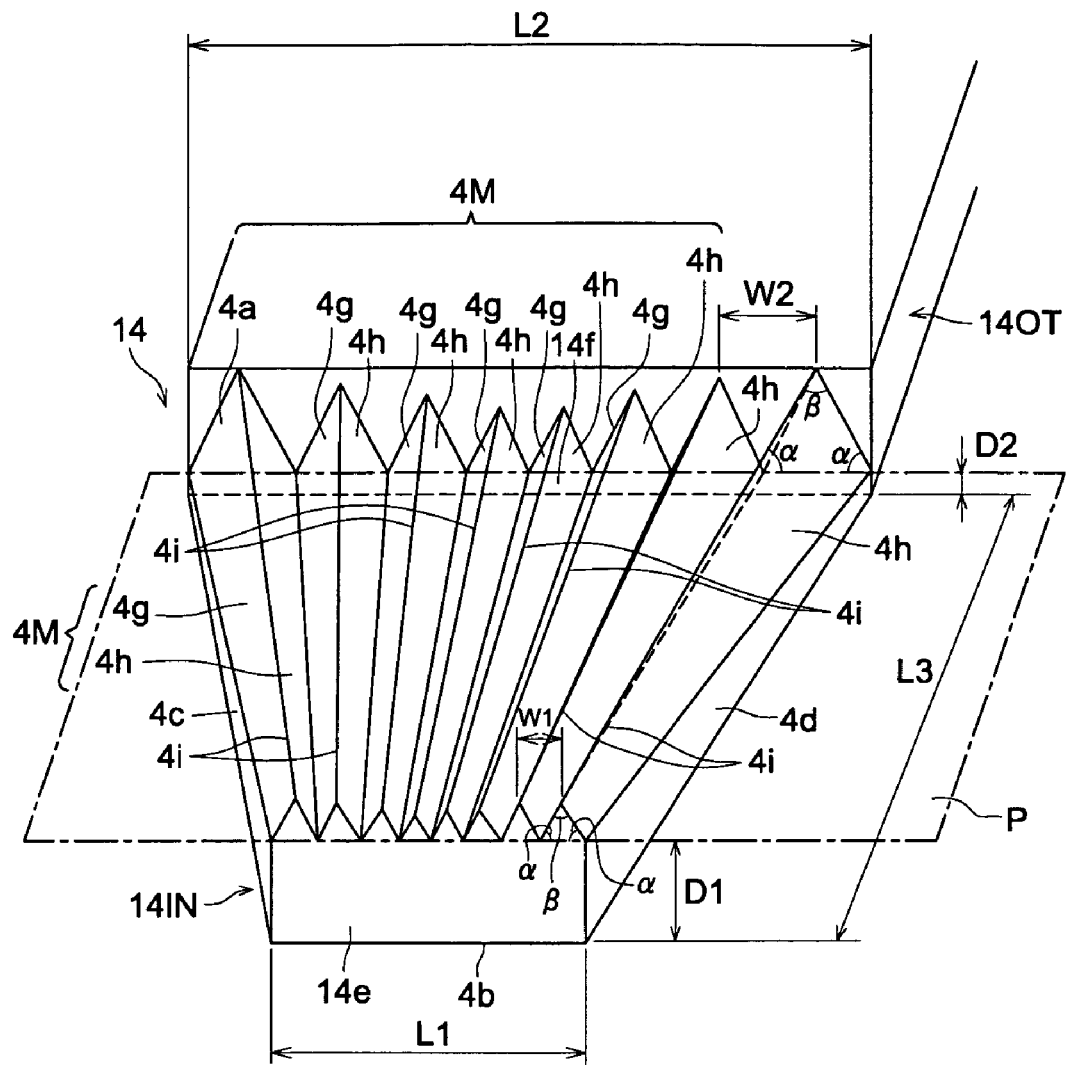
Figure 29:
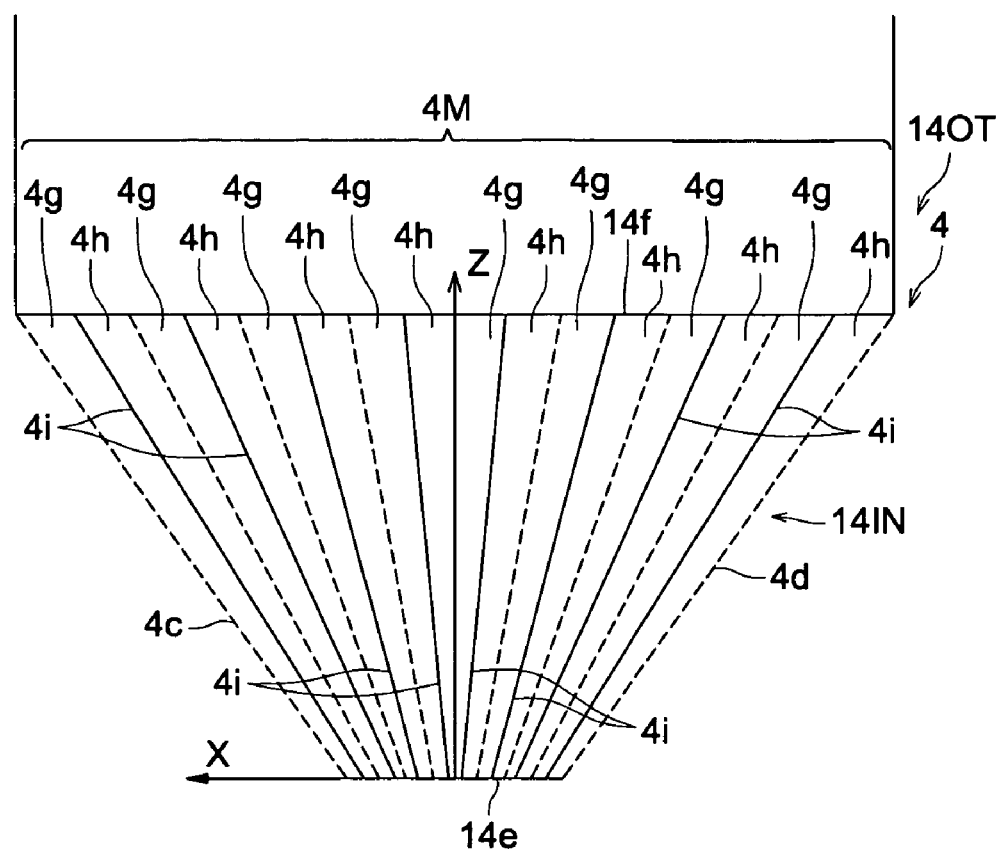
Figure 30:
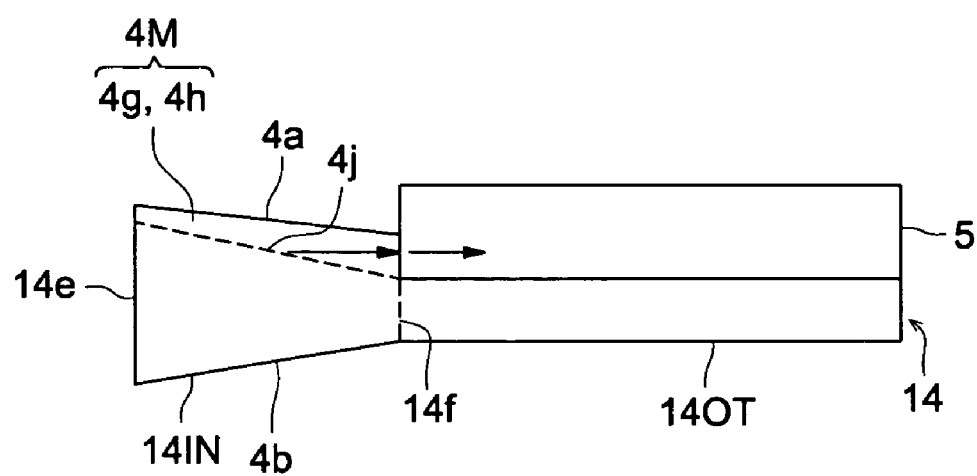
Figure 32:
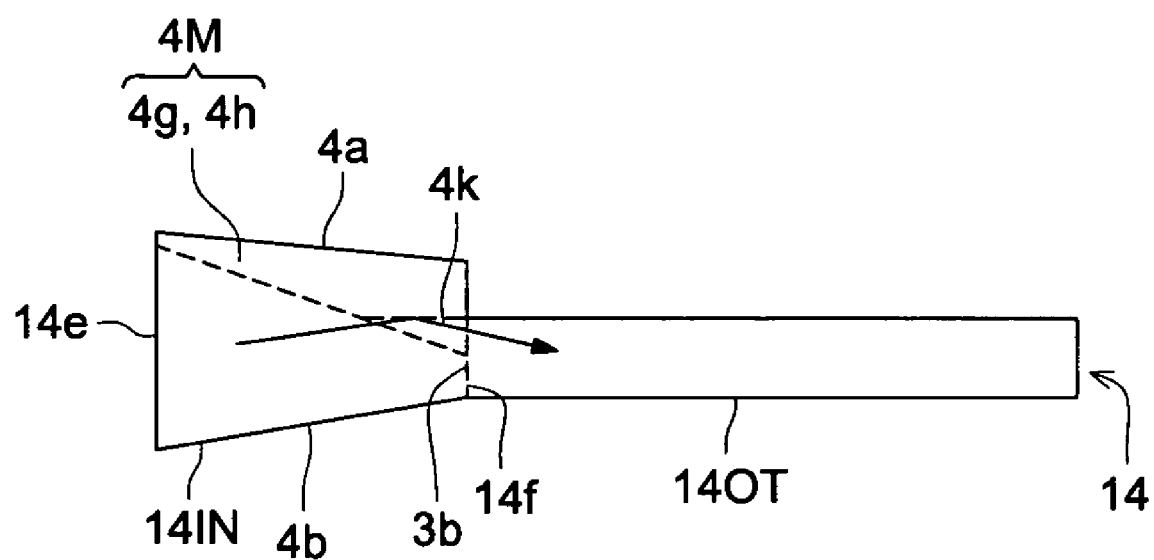
Figure 33:
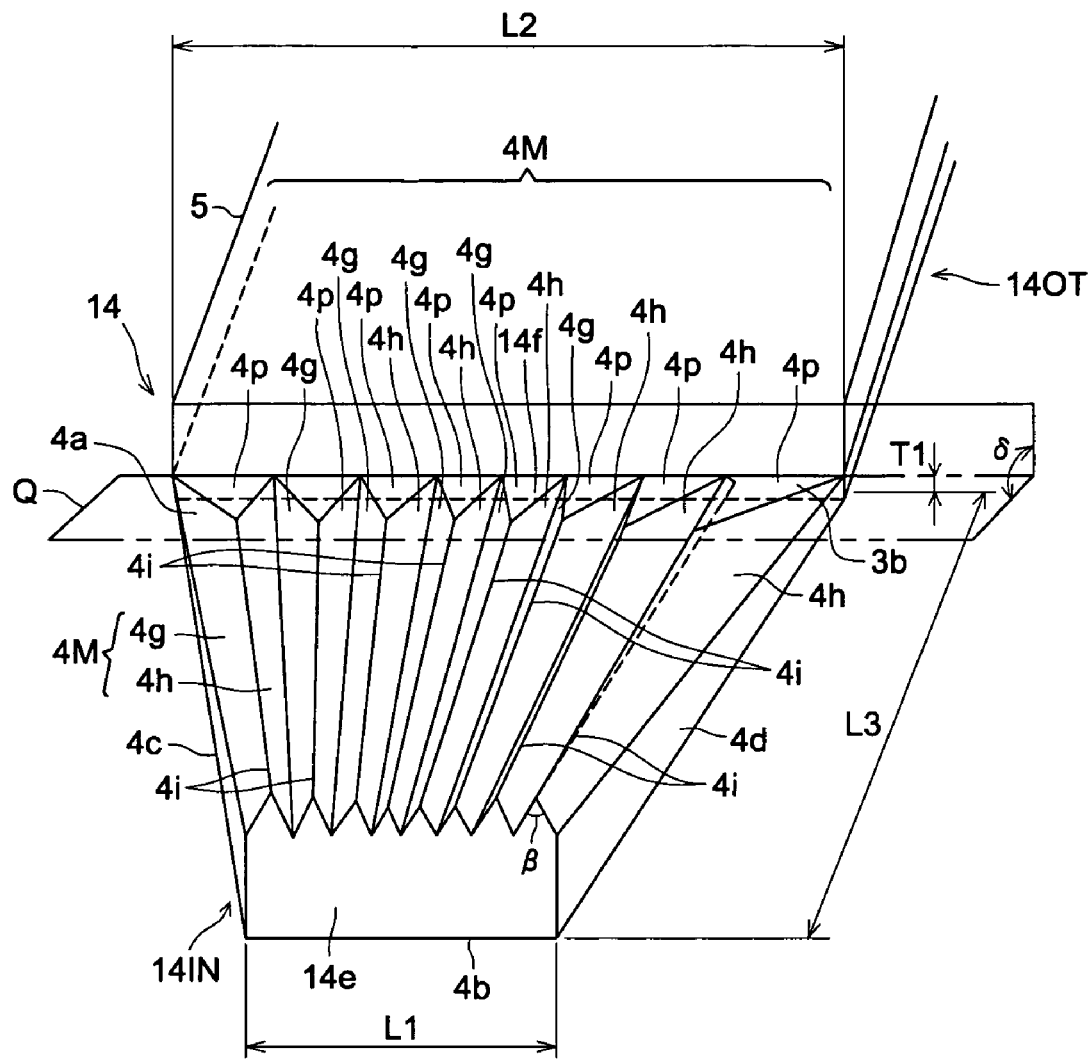
Figure 34:
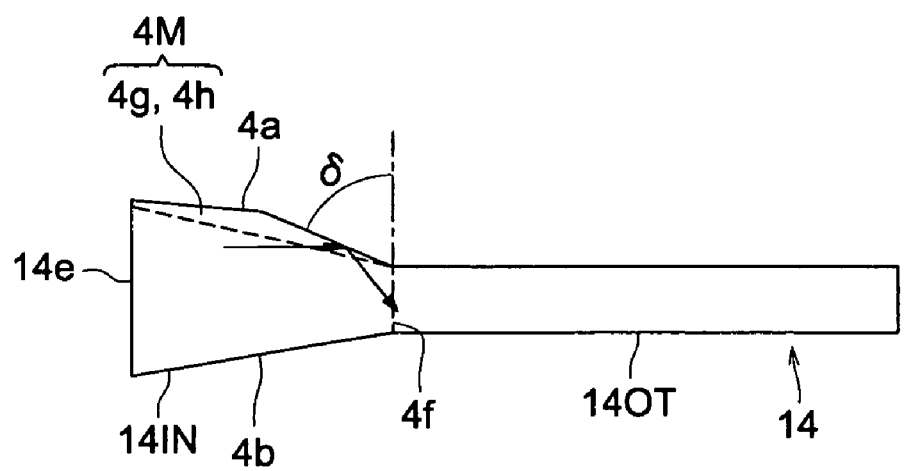
Figure 35:
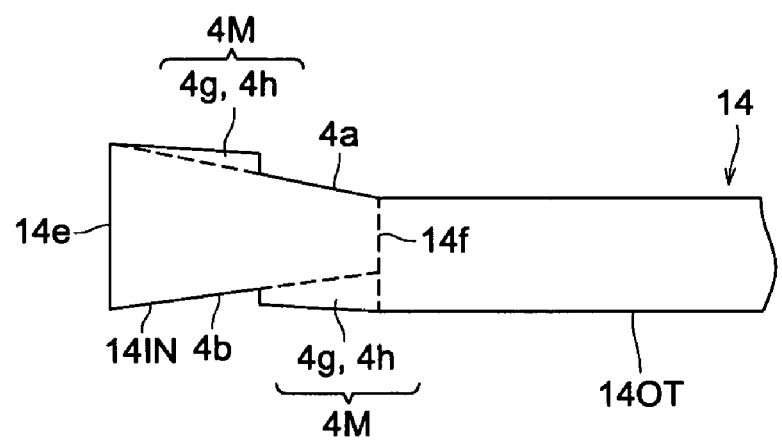
Figure 36:
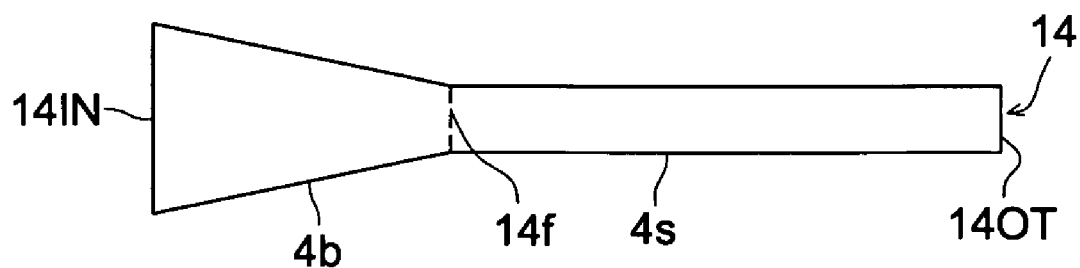
Figure 36:
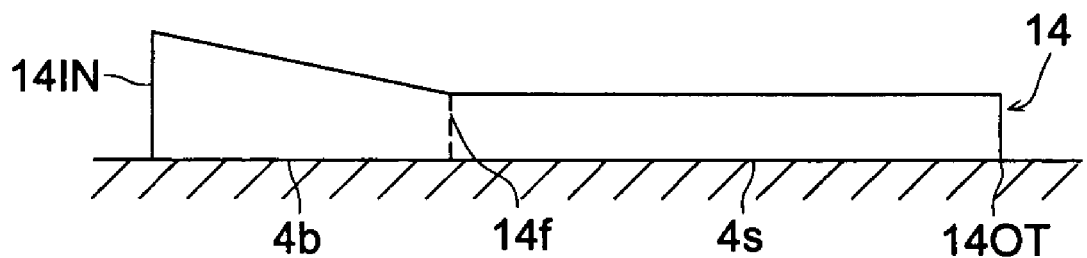

FIG. 17 is a perspective view showing light guide element 4 and light guide plate 3 relating to the fourth embodiment;

FIG. 18 is a diagram wherein the fourth embodiment shown in FIG. 17 is viewed from the side;

Each of FIGS. 19(*a*) and 19(*b*) is a graph showing the results of simulations conducted by the inventor of this invention;

FIG. 20 is a side view of light guide element 4 relating to variation of the first to fourth embodiments;

Each of FIGS. 21(*a*) and 21(*b*) is a side view of light guide element 4 and light guide plate 3 relating to variation of the first to fourth embodiments;

FIG. 22 is a sectional view of a backlight apparatus including a light guide unit relating to the first embodiments;

FIG. 23 is a sectional view of the backlight apparatus taken on line XXIII-XXIII and viewed in the arrowed direction on the backlight apparatus shown in FIG. 22;

FIG. 24 is a schematic perspective view of incident section 14IN;

FIG. 25(*a*) is a side view of incident section 14IN, FIG. 25(*b*) is a top view of incident section 14IN and FIG. 25(*c*) is an enlarged diagram wherein a pair of slopes 4*g* and 4*h* are viewed in the direction toward the emitting surface side;

Each of FIGS. 26(*a*)-26(*c*) is a side view of an incident section relating to the variations of the first embodiment;

Each of FIGS. 27(*a*)-27(*f*) is a top view of an incident section relating to the variations of the first embodiment;

FIG. 28 is a perspective view of a incident section relating to the second embodiment;

FIG. 29 is a top view of the incident section shown in FIG. 28;

FIG. 30 is a side view showing light guide unit 14 relating to the second embodiment;

FIG. 31 is a perspective view showing light guide unit 14 relating to the third embodiment;

FIG. 32 is a diagram wherein the third embodiment shown in FIG. 31 is viewed from the side;

FIG. 33 is a perspective view showing light guide unit 14 relating to the fourth embodiment;

FIG. 34 is a diagram wherein the fourth embodiment shown in FIG. 33 is viewed from the side;

FIG. 35 is a side view of light guide unit 14 relating to variation of the first to fourth embodiments; and Each of FIGS. 36(*a*) and 36(*b*) is a side view of light guide unit 14 relating to variation of the first to fourth embodiments.

DESCRIPTION OF THE PREFERRED EMBODIMENT

Preferred embodiments of the invention will be explained as follows.

An embodiment of the present invention is a light guide element for being arranged between a light source and a light guide plate and for guiding a light flux from the light source into the light guide plate. The light guide element includes: an incident surface for receiving an incident light flux from the light source; an emitting surface for emitting a light flux to the light guide plate; and a top surface and a base surface both extending in a direction to intersect with the incident surface and the emitting surface and facing each other. One of the top surface and the base surface inclines to the other so that a dimension of the emitting surface along a thickness of the light guide plate becomes smaller than a dimension of the incident surface along the thickness of the light guide plate. The light guide element further includes a structure in a light leakage reducing shape arranged on at least one of the top surface and the base surface. The light leakage reducing shape reduces an amount of light emitted from surfaces of the light guide element excluding the emitting surface out of the incident light emitted from the incident surface.

In the above light guide element, the structure in a light leakage reducing shape includes a plurality of reflection surfaces. When an incident light flux emitted from the light source travels along a plane extending in a direction from the incident surface to the emitting surface and further extending along the thickness of the light guide plate, the plurality of reflection surfaces provide the light flux traveling along the plane with a direction component so as to deflect away from the plane.

In the light guide element including the above structure, each of the aforesaid top surface and the base surface is inclined to the other surface each other so that a dimension of the emitting surface in the direction of a thickness of the light guide plate may be smaller than a dimension of the incident surface in the direction of a thickness of the light guide plate. Therefore, even for the thin light guide plate, the light guide element can guide properly the light emitted from the light source that is thicker than the thin light guide plate. On the other hand, when the light source has a light emission property such that an intensity of the light emitted from the light source to the front side direction of the light source is low, a part of light emitted from the light source becomes hard to satisfy the condition of total reflection after repeating reflection between the top surface and the base surface which are inclined to each other. It is apprehended that the light leaks out through the top surface or the base surface. To solve it, the embodiment relating to the invention includes, on at least one of the top surface and the base surface thereof, a structure in a light leakage reducing shape that controls an amount of light emitted from the surfaces excluding the emitting surface among a light flux having entered from the incident surface. Therefore, it is easy for the light flux that has entered from the incident surface to satisfy the condition of total reflection even when the light repeats reflection between the top surface and the base surface inclined each other. It allows to control the light leaking out through the top surface or the base surface, and to enhance the utilization efficiency of light.

Further, because the incident light flux emitted from the light source travels along a plane extending in a direction from the incident surface to the emitting surface and further extending along the thickness of the light guide plate, the plurality of reflection surfaces provide the light flux traveling along the plane with a direction component so as to deflect the light flux away from the plane. Therefore, it makes the structure satisfy the total reflection condition easily.

It is preferable that the light leakage reducing shape includes a plurality of ridges extending in a direction from the incident surface to the emitting surface and formed of the plurality of reflection surfaces. Therefore, its mass production is possible through, for example, injection molding. Incidentally, the light leakage reducing shape may either be formed integrally together with the top surface and/or the base surface, or be formed separately to adhere to the top surface and/or the base surface.

Further, it is preferable that the light leakage reducing shape includes plural pairs of slopes, and each pair of the slopes forms an intersection extending in a direction from the incident surface to the emitting surface.

An embodiment of the present invention is the light guide element preferably including a pair of side surfaces facing each other and both extending in a direction to intersect with the incident surface and the emitting surface. An interval between the pair of side surfaces at a position closer to the emitting surface is wider than that at a position closer to the incident surface. Therefore, it makes the structure satisfy the total reflection condition easily.

It is preferable that the above light guide element has a pair of side surfaces facing each other and extending in a direction to intersect with the incident surface and the emitting surface. An interval between the pair of side surfaces at a position closer to the emitting surface is wider than that at a position closer to the incident surface. The light leakage reducing shape comprises plural pairs of slopes. Each pair of slopes forms an intersection extending in a direction from the incident surface to the emitting surface. An interval between neighboring intersections at a position closer to the incident surface is smaller than that at a position closer to the emitting surface. Therefore, it becomes easy to control the traveling direction of light entered through the incident surface and it becomes possible to control various properties at the emitting surface such as illuminance distribution and luminance distribution to achieve desired purpose. Thus, uneven illuminance on the emitting surface can be reduced. Further, it is possible to enhance the utilization efficiency of light because it becomes easy for the light flux that has entered through the incident surface to satisfy the condition of total reflection.

In the aforesaid embodiment, it is preferable that the following conditional expression (4) is satisfied when β represents an angle formed between the pair of slopes at the aforesaid intersection.

$$100°≦β≦170°\qquad(4)$$

When angle β formed by the pair of slopes in the aforesaid intersection satisfies the conditional expression (4), the utilization efficiency of light can be enhanced so that it is easy for the light flux that has entered the light guide element to satisfy the condition of total reflection. For example, the light utilization efficiency that is 1.2 times larger than that in the case of no slopes or more can be realized. If β is 170° or less, in particular, an effect of control of the light flux in its traveling direction can be enhanced, and sufficient light utilization efficiency can be obtained. If β is 100° or more, on the other hand, a tip portion of each slope results in a form that is hard to be damaged. Therefore, manufacturing becomes to be easy and fewer broken pieces adhere to the light guide element. Thus, unnecessary influence of scattering is controlled and sufficient light utilization efficiency can be obtained. Preferably, if β is arranged to satisfy the following expression, the light utilization efficiency that is 1.3 times or more larger than that in the case of no slopes can be realized.

$$116°≦β≦165°\qquad(4')$$

In the aforesaid embodiment of the present invention, at least a part of the structure in the light leakage reducing shape preferably protrudes from the incident surface of the light guide plate at the emitting surface of the light guide element. It ensures strength of a section of the light guide element at the emitting surface side even when the light guide plate is thin.

In the aforesaid embodiment of the present invention, a dimension of the emitting surface of the light guide element along a thickness of the light guide plate is preferably smaller than a thickness of the incident surface of the light guide plate. It ensures strength of a section of the light guide element at the emitting surface side even when the light guide plate is thin.

In the aforesaid embodiment, it is preferable that the structure in the light leakage reduction shape has a dimension along a thickness of the light guide plate gradually increasing in a direction from the incident surface to the emitting surface. Therefore, it becomes easy to control the traveling direction of light entered through the incident surface, and it becomes possible to control various properties such as illuminance distribution and luminance distribution to achieve desired purpose. Thus, uneven illuminance on the emitting surface can be reduced. Further, it is possible to enhance the utilization efficiency of light because it becomes easy for the light flux that has entered through the incident surface to satisfy the condition of total reflection.

In the aforesaid embodiment of the present invention, the structure in the light leakage reduction shape preferably has a dimension along a thickness of the light guide plate gradually increasing and then gradually decreasing in a direction from the incident surface to the emitting surface. Therefore, it increases the efficiency of light utilization.

In the aforesaid embodiment, the light leakage reducing shape preferably includes plural pairs of slopes, in which each pair of the slopes forms an intersection extending in a direction from the incident surface to the emitting surface. The light leakage reducing shape preferably further includes a plurality of separation surfaces each extending along the base surface and each arranged at an emitting-surface side of the light guide element between two adjacent slopes which form a trough.

Even in the case of using a thin light guide plate, for example, enough thickness of the end at the emitting surface side is required for securing strength of the light guide element, resulting in that the top surface side of the emitting surface is occasionally protruded from the incident surface of the light guide plate. In such a case, a light flux traveling in the light guide element leaks out to the outside of the light guide plate occasionally through the protruded emitting surface, and an appropriate use of light is not attained. In contrast to this, this embodiment provides separating surfaces each arranged between the two neighboring slopes forming a trough and each extending in the direction parallel to the base surface on the aforesaid emitting surface side. The separating surfaces reflect a light flux coming from the inside of the light guide element and thereby control the light leaking out. Therefore, an appropriate use of light can be attained. Meanwhile, the separating surface may either be a flat surface or a curved surface.

In the aforesaid embodiment, it is preferable that each of the two adjacent slopes intersects with one of the plurality of separation surfaces at an intersection line, and that an interval between the intersection lines of the two adjacent slopes gradually increases in a direction from the incident surface to the emitting surface.

In the aforesaid embodiment, each of the plurality of separating surfaces preferably comes in contact with the emitting surface and does not come in contact with the incident surface.

In the aforesaid embodiment, it is preferable that the aforesaid light leakage reducing shape includes plural pairs of slopes, in which each pair of the slopes forms an intersection extending in a direction from the incident surface to the emitting surface. It is preferable that the aforesaid light leakage reducing shape further includes a plurality of tapered surfaces each intersecting with two neighboring slopes forming a ridge, each coming in contact with the emitting surface, and each inclining to the incident surface at a predetermined angle with the emitting surface.

The aforesaid embodiment provides tapered surfaces each of that is in contact with the emitting surface and is inclined toward the incident surface side for the emitting surface by a prescribed angle, to reflect a light flux coming from the inside of the light guide element. The structure controls the light leaking out, therefore, it is possible to attain an appropriate use of light. Meanwhile, the tapered surface may either be a flat surface or a curved surface.

An embodiment of the present invention is the above light guide element in which the each pair of slopes preferably forms the intersection at a constant angle over the whole length of the intersection.

In the aforesaid embodiment of the present invention, the light guide element is preferably attached to the light guide plate with the top surface and the base surface of the light guide element inclining to a base surface of the light guide plate. It increases the efficiency of light utilization.

In the aforesaid embodiment of the present invention, the light guide element is preferably attached to the light guide plate with the base surface of the light guide element forming a same plane to the base surface of the light guide plate. It makes manufacturing the backlight apparatus including the above light guide element easier.

In the aforesaid embodiment of the present invention, the above light guide element preferably includes a plurality of incident surfaces. It makes assembling of the embodiment easier, and makes manufacturing the backlight apparatus including the above light guide element easier.

In the aforesaid embodiment of the present invention, the light source is preferably LED.

Another embodiment of the present invention is a backlight apparatus including the above light guide of the embodiment of the present invention.

Another embodiment of the present invention is a backlight apparatus provided for being arranged between a light source and a liquid crystal element. The backlight apparatus includes: a light guide element for receiving an incident light flux from the light source; and a light guide plate emitting a light flux from the light guide element to the liquid crystal element. The light guide element includes: an incident surface for receiving an incident light flux from the light source; an emitting surface for emitting a light flux to the light guide plate; and a top surface and a base surface both extending in a direction to intersect with the incident surface and the emitting surface and facing each other. One of the top surface and the base surface inclines to the other so that a dimension of the emitting surface along a thickness of the light guide plate becomes smaller than a dimension of the incident surface along the thickness of the light guide plate. The light guide element further includes a structure in a light leakage reducing shape including a plurality of reflection surfaces arranged on at least one of the top surface and the base surface. When an incident light flux emitted from the light source travels along a plane extending in a direction from the incident surface to the emitting surface and further extending along the thickness of the light guide plate, the plurality of reflection surfaces provide the light flux traveling along the plane with a direction component so as to deflect away from the plane. The function and effect of the embodiment are similar to the above light guide elements.

Another embodiment of the present invention is a light source apparatus provided for a light guide plate. The light source apparatus includes: a light source; and a light guide element arranged between the light source and the light guide plate, for guiding a light flux from the light source into the light guide plate. The light source is attached to the light guide element to form one body. The light guide element includes: an incident surface for receiving an incident light flux from the light source; an emitting surface for emitting a light flux to the light guide plate; and a top surface and a base surface both extending in a direction to intersect with the incident surface and the emitting surface and facing each other. One of the top surface and the base surface inclines to the other so that a dimension of the emitting surface along a thickness of the light guide plate becomes smaller than a dimension of the incident surface along the thickness of the light guide plate. The light guide element further includes: a structure in a light leakage reducing shape including a plurality of reflection surfaces arranged on at least one of the top surface and the base surface. When an incident light flux emitted from the light source travels along a plane extending in a direction from the incident surface to the emitting surface and further extending along the thickness of the light guide plate, the plurality of reflection surfaces provide the light flux traveling along the plane with a direction component so as to deflect away from the plane. The function and effect of the embodiment are similar to the above light guide elements.

Another embodiment of the present invention is a light guide unit including: an incident section for receiving an incident light flux from a light source; and an emitting section for emitting the incident light flux outside of the light guide unit. The incident section and the emitting section are integrally formed in one body. The incident section is the above light guide element, and the emitting section includes an incident surface and an emitting surface extending in a direction perpendicular to the incident surface of the emitting section.

In other words, in the light guide unit, the incident section includes: an incident surface for receiving an incident light flux from the light source; a boundary plane forming a boundary between the incident section and the emitting section, where the light flux from the incident surface passes through toward the emitting section; and a top surface and a base surface both extending in a direction to intersect with the incident surface and the boundary plane facing each other. One of the top surface and the base surface inclines to the other so that a dimension of the boundary plane along a thickness of the light guide unit becomes smaller than a dimension of the incident surface along the thickness of the light guide unit. The light guide unit further includes a structure in a light leakage reducing shape arranged on at least one of the top surface and the base surface. The light leakage reducing shape reduces an amount of light emitted from surfaces of the incident section excluding the emitting surface out of the incident light emitted from the incident surface. The emitting section comprises an incident surface and an emitting surface extending in a direction perpendicular to the incident surface of the emitting section.

In the light guide unit, the structure in a light leakage reducing shape includes a plurality of reflection surfaces. When an incident light flux emitted from the light source travels along a plane extending in a direction from the incident surface to the boundary plane and further extending along the thickness of the light guide unit, the plurality of reflection surfaces provide the light flux traveling along the plane with a direction component so as to deflect away from the plane.

In the light guide unit including the above structure, each of the aforesaid top surface and the base surface is inclined to the other surface each other so that a dimension of the boundary plane in the direction of a thickness of the light guide unit may be smaller than a dimension of the incident surface in the direction of a thickness of the light guide unit. Therefore, the incident section can guide properly the light emitted from the light source that is thicker than the thin light guide unit. On the other hands, in the light guide unit including a light source with a light emission property such that an intensity of the light emitted from the light source is low to the front direction of the light source, a part of light emitted from the light source becomes hard to satisfy the condition of total reflection after repeating reflection between the top surface and the base surface which are inclined each other. It is apprehended that the light leaks out through the top surface or the base surface. To solve it, the light guide unit including the above structure is provided with, on at least one of the top surface and the base surface thereof, a structure in a light leakage reducing shape. The structure controls an amount of light emerging from the surface other than the emitting surface among light flux having entered through the incident surface. Therefore, it is easy for the light that has entered through the incident surface to satisfy the condition of total reflection even when the light repeats reflection between the top surface and the base surface inclined each other. It allows to control the light leaking out through the top surface or the base surface, and to enhance the utilization efficiency of light. In this specification, "boundary plane" means that an imaginary plane forming a boundary between the incident section and the emitting section, which is not exposed out of the light guide unit.

Further, when an incident light flux emitted from the light source travels along a plane extending in a direction from the incident surface to the boundary plane and further extending along the thickness of the light guide unit, the plurality of reflection surfaces provide the light flux traveling along the plane with a direction component so as to deflect the light flux away from the plane. Therefore, it makes the structure satisfy the total reflection condition easily.

It is preferable that, in the above light guide unit, the light leakage reducing shape includes a plurality of ridges extending in a direction from the incident surface to the boundary plane and formed of the plurality of reflection surfaces, and its mass production is possible through, for example, injection molding. Incidentally, the light leakage reducing shape may either be formed integrally together with the top surface and/or the base surface, or be formed separately to adhere to the top surface and/or the base surface.

Further, it is preferable that the light leakage reducing shape includes plural pairs of slopes, and each pair of the slopes forms an intersection extending in a direction from the incident surface to the boundary plane.

In the present embodiment, the light guide unit preferably includes a pair of side surfaces facing each other and both extending in a direction to intersect with the incident surface and the boundary plane. An interval between the pair of side surfaces at a position closer to the boundary plane is wider than that at a position closer to the incident surface. Therefore, it makes the structure satisfy the total reflection condition easily.

In the present embodiment, it is preferable that the light guide unit has a pair of side surfaces facing each other and extending in a direction to intersect with the incident surface and the boundary plane. An interval between the pair of side surfaces at a position closer to the boundary plane is wider than that at a position closer to the incident surface. The light leakage reducing shape comprises plural pairs of slopes. Each pair of slopes forms an intersection extending in a direction from the incident surface to the boundary plane. An interval between neighboring intersections at a position closer to the incident surface is smaller than that at a position closer to the boundary plane. Therefore, it becomes easy to control the traveling direction of light entered through the incident surface and it becomes possible to control various properties at the boundary plane such as illuminance distribution and luminance distribution to achieve desired purpose. Thus, uneven illuminance on the boundary plane can be reduced. Further, it is possible to enhance the utilization efficiency of light because it becomes easy for the light flux that has entered through the incident surface to satisfy the condition of total reflection.

In the aforesaid embodiment, it is preferable that the following conditional expression (4) is satisfied when $\beta$ represents an angle formed by the pair of slopes at the aforesaid intersection.

$$100° \leq \beta \leq 170° \tag{4}$$

When angle $\beta$ formed by the pair of slopes in the aforesaid intersection satisfies the conditional expression (4), the utilization efficiency of light can be enhanced so that it is easy for the light flux that has entered the incident section to satisfy the condition of total reflection. For example, the light utilization efficiency that is 1.2 times larger than that in the case of no slopes or more can be realized. If $\beta$ is 170° or less, in particular, an effect of control of the light flux in its traveling direction can be enhanced, and sufficient light utilization efficiency can be obtained. If $\beta$ is 100° or more, on the other hand, a tip portion of each slope results in a form that is hard to damaged. Therefore, manufacturing becomes to be easy and fewer broken pieces adhere to the light guide unit. Thus, unnecessary influence of scattering is controlled and sufficient light utilization efficiency can be obtained. Preferably, if $\beta$ is arranged to satisfy the following expression, the light utilization efficiency that is 1.3 times or more larger than that in the case of no slopes can be realized.

$$116° \leq \beta \leq 165° \tag{4'}$$

In the aforesaid embodiment of the present invention, at least a part of the structure in the light leakage reducing shape preferably protrudes from the boundary plane of the incident section. It ensures strength of a vicinity of the boundary plane even when the emitting section is thin.

In the above light guide unit, a thickness of the end of the incident section at the boundary-plane side along the thickness of the light guide unit is preferably smaller than a thickness of the end at the boundary-plane side of the emitting section. It ensures strength of a vicinity of the boundary plane of the light guide unit even when the emitting section is thin.

In the present embodiment, it is preferable that the structure in the light leakage reduction shape has a dimension along a thickness of the light guide unit gradually increasing in a direction from the incident surface to the boundary plane. Therefore, it allows to easily control the traveling direction of light entered through the incident surface, and to control various properties such as illuminance distribution and luminance distribution to achieve desired purpose. Thus, uneven illuminance on the aforesaid boundary plane can be reduced. Further, it is possible to enhance the utilization efficiency of light because it becomes easy for the light flux that has entered through the incident surface to satisfy the condition of total reflection.

In the present embodiment, the above light guide unit preferably includes the structure in the light leakage reduction shape which has a dimension along a thickness of the light guide unit gradually increasing and then gradually decreasing in a direction from the incident surface to the boundary plane surface. Therefore, it increases the efficiency of light utilization.

In the present embodiment, the light leakage reducing shape preferably includes plural pairs of slopes, in which each pair of the slopes forms an intersection extending in a direction from the incident surface to the boundary plane. The light leakage reducing shape preferably further includes a plurality of separation surfaces each extending along the base surface and each arranged at a boundary-plane side of the incident section between two adjacent slopes which form a trough.

Even in the case of using a light guide unit having the thin emitting section, for example, the boundary plane cannot be unlimitedly made thin for securing a strength of the vicinity of the boundary plane, resulting in that the an end portion at the boundary-surface side of the incident section is occasionally protruded from the boundary side of the emitting section. In such a case, a light flux traveling in the incident section leaks out to the outside of the incident section occasionally through the protruded end portion of the incident section, and an appropriate use of light is not attained. In contrast to this, this embodiment provides separating surfaces each arranged between the two slopes forming a trough and each extending in the direction parallel to the base surface on the aforesaid boundary plane side. The separating surfaces reflect a light flux coming from the inside of the incident section and thereby control the light leaking out. Therefore, an appropriate use of light can be attained. Meanwhile, the separating surface may either be a flat surface or a curved surface.

In the this embodiment, it is preferable that each of the two adjacent slopes intersects with one of the plurality of separation surfaces at an intersection line, and that an interval between the intersection lines of the two adjacent slopes gradually increases in a direction from the incident surface to the boundary plane.

In the aforesaid embodiment, each of the plurality of separating surfaces preferably extends to the boundary plane and does not come in contact with the incident surface.

In the aforesaid embodiment, it is preferable that the aforesaid light leakage reducing shape includes plural pairs of slopes, in which each pair of the slopes forms an intersection extending in a direction from the incident surface to the boundary plane; and further includes a plurality of tapered surfaces each intersecting with two neighboring slopes forming a ridge, each extending from the boundary plane, and each inclining to the incident surface at a predetermined angle with the boundary plane.

The aforesaid embodiment provides tapered surfaces each of that extends from the boundary plane and inclines toward the incident surface side at a prescribed angle with the boundary plane. The tapered surfaces reflects a light flux coming from the inside of the incident section and thereby controls the light leaking out. Therefore, it is possible to attain an appropriate use of light. Meanwhile, the tapered surface may either be a flat surface or a curved surface.

In the above embodiment, the each pair of slopes preferably forms the intersection at a constant angle over the whole length of the intersection.

In the present embodiment, it is preferable that the top surface and the base surface of the incident section inclines to a base surface of the emitting section. It increases the efficiency of light utilization.

In the present embodiment, it is preferable that the base surface of the incident section forms a same plane to the base surface of the emitting section. It makes manufacturing the backlight apparatus including the above light guide unit easier.

In the present embodiment, the above incident section preferably includes a plurality of incident surfaces. It makes assembling of the embodiment easier, and makes manufacturing the backlight apparatus easier.

In the present embodiment, the light source is preferably LED.

Another embodiment of the present invention is a backlight apparatus including the light guide unit of the above embodiment.

Another embodiment of the present invention is a backlight apparatus including: an incident section for receiving an incident light flux from the light source; and an emitting section emitting a light flux from the incident section to outside of the backlight apparatus. The incident section and the emitting section are integrally formed as one body. The incident section is the light guide element of the above embodiment, and the emitting section comprises an incident surface and an emitting surface extending in a direction perpendicular to the incident surface of the emitting section. In other words, the backlight apparatus includes: an incident section for receiving an incident light flux from the light source; and an emitting section emitting a light flux from the incident section to outside of the backlight apparatus. The light guide unit further includes, in the incident section, an incident surface for receiving the light flux from the light source; a boundary plane defining a boundary between the incident section and the emitting section, through which a light flux traversing from the incident section to the emitting section; and a top surface and a base surface both extending in a direction to intersect to the incident surface and the boundary plane and facing each other. One of the top surface and the base surface inclines to the other so that a dimension of the boundary plane along a thickness of the light guide unit becomes smaller than a dimension of the incident surface along the thickness of the light guide unit. The light guide unit further includes a structure in a light leakage reducing shape arranged on at least one of the top surface and the base surface. The light leakage reducing shape reduces an amount of light emitted from surfaces of the incident section excluding the boundary plane out of the incident light emitted from the incident surface. The emitting section comprises an incident surface and an emitting surface extending in a direction perpendicular to the incident surface of the emitting section. A function and effect of the present invention are similar to the above light guide units.

In the aforesaid embodiment, it is possible to provide a light guide element and a light guide unit that can conduct easily light emitted from the light source even for a thin light guide plate and yet can enhance the utilization efficiency of light, a backlight apparatus and a light source apparatus each employing the light guide element or the light guide unit.

First Embodiment

Figure 1:
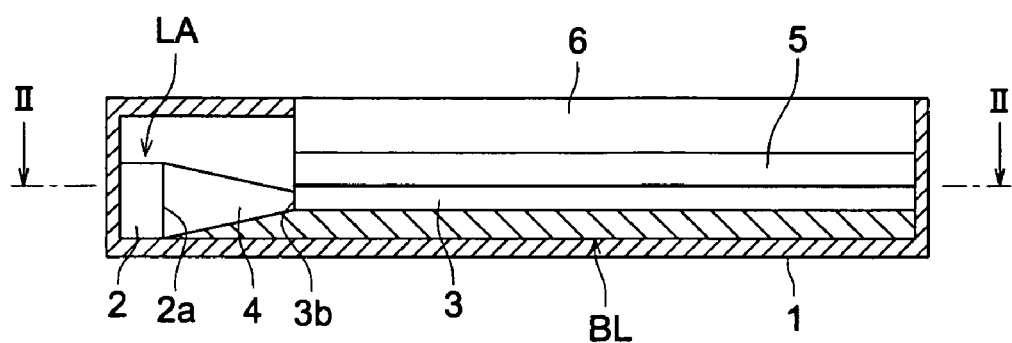
FIG. 1 is a sectional view of a backlight apparatus including a light guide element relating to the first embodiment.
Figure 2:
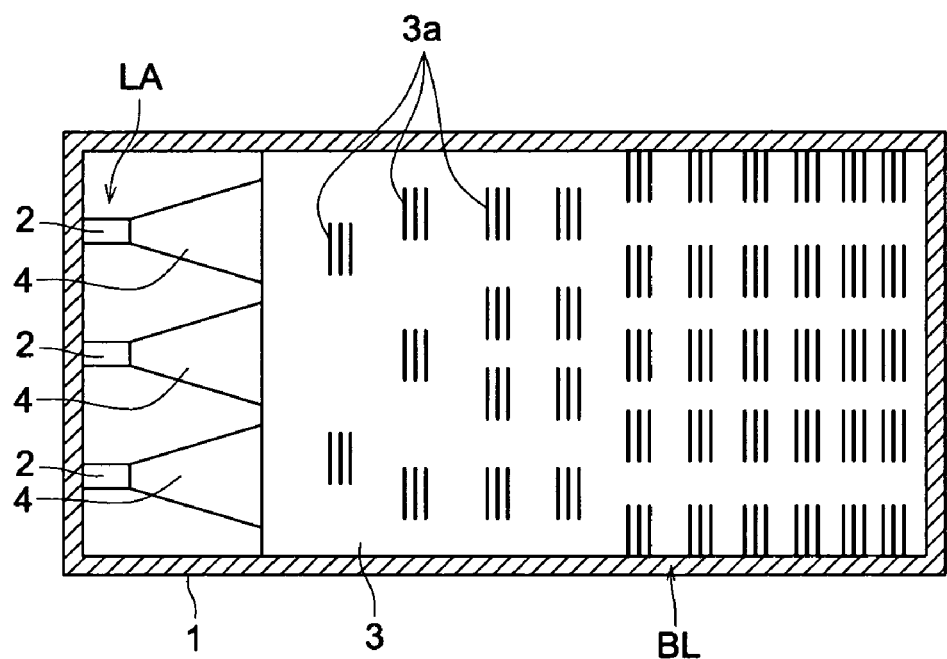
FIG. 2 is a sectional view of the backlight apparatus taken on line II-II and viewed in the arrowed direction on the backlight apparatus shown in FIG. 1.

The embodiment relating to the invention will be explained in a more detailed way as follows, referring to the drawings. FIG. 1 is a sectional view of backlight apparatus BL including a light guide element and light source apparatus LA relating to the present embodiment, and FIG. 2 is another sectional view of backlight apparatus BL taken on line II-II and viewed in the arrowed direction on the backlight apparatus shown in FIG. 1. In FIGS. 1 and 2, LED 2 representing three light sources and thin-plate-shaped light guide plate 3 are arranged in casing 1, and there are arranged three light guide elements 4 (see FIG. 2) between the light sources and thin-plate-shaped light guide plate 3. Light guide plate 3 has light transmittable property. On the top surface of light guide plate 3, there are formed microscopic convex portions (or concave portions) 3a. The convex portions 3a representing light scattering portions grow greater (higher) and become narrowed in terms of their arrangement distance, as they get away from LED 2. Therefore, light radiated from the top surface of the light guide plate 3 can be totally brought to uniformity. Further, diffusion plate 5 is arranged on the top surface of the light guide plate 3, and liquid crystal display element 6 is arranged on the top surface of the diffusion plate 5. Incidentally, light source apparatus LA can be constituted by attaching integrally on the light guide element 4 as one body. Backlight apparatus BL is composed of LED 2, light guide element 4, light guide plate 3 and diffusion plate 5.

In FIGS. 1 and 2, light guide element 4 guides light emitted from LED 2 into light guide plate 3, and the light is projected uniformly from the top surface of the light guide plate 3 toward a bottom surface of liquid crystal display element 6 through diffusion plate 5.

FIG. 3 is a schematic perspective view of light guide element 4. In the mean time, the direction of a thickness of the light guide plate is assumed to be the vertical direction (Y direction) and the direction of a width of the light guide plate is assumed to be the horizontal direction (X direction), in FIG. 3. Light guide element 4 is formed integrally of transparent resins such as PC and PMMA as one body, and includes therein top surface 4a, base surface 4b, side surfaces 4c and 4d. Light guide element 4 further includes incident surface 4e and emitting surface 4f each intersecting with the aforesaid surfaces.

Incident surface 4e is arranged to be in contact with or to be close to emitting surface 2a of LED 2 (see FIG. 1), while, emitting surface 4f is arranged to be in contact with or to be close to incident surface 3b of light guide plate 3 (see FIG. 1). Dimension D1 of incident surface 4e in the vertical direction is greater than dimension D2 of emitting surface 4f in the vertical direction, while, dimension L1 of incident surface 4e in the horizontal direction is smaller than dimension L2 of emitting surface 4f in the horizontal direction. Owing to the form stated above, the light guide element 4 can guide the light emitted from LED 2 to the thin light guide plate 3.

Further, in the light guide element 4, a structure in a light leakage reducing shape 4M is formed on top surface 4a.

In this specification, dimension D1 of incident surface 4e in the vertical direction represents a length in the vertical direction of the end at the incident surface 4e side of the light guide element 4 which does not include the structure in the light leakage reducing shape. Dimension D2 of emitting surface 4f in the vertical direction represents a length in the vertical direction of the end at the emitting surface 4f side of the light guide element 4 which does not include the structure in the light leakage reducing shape.

Alternatively, an embodiment of the present invention may also provide a light guide unit including incident section 14IN and emitting section 14OT, namely the above light guide element and the above light guide plate, which are integrally formed as one body, as shown in FIGS. 22 and 23.

FIG. 22 is a sectional view of backlight apparatus BL including a light guide unit relating to the present embodiment, and FIG. 23 is another sectional view of backlight apparatus BL taken on line XXIII-XXIII and viewed in the arrowed direction on the backlight apparatus BL shown in FIG. 22. In FIGS. 22 and 23, LED 2 representing three light sources and light guide unit 14. Light guide unit 14 is formed of a transparent resin such as PC, PMMA and includes thin-plate-shaped emitting section 14OT and incident section 14 IN arranged between LED 2 and emitting section 14OT, which are integrally formed as one body. The embodiment provides three incident sections 14IN in trapezoid plate shape protruding from a light source side surface of emitting section 14OT (see FIG. 23). Emitting section 14OT includes emitting surface 14k arranged at the top surface of emitting section 14OT where microscopic convex portions (or concave portions) 14a are formed. The convex portions 14a representing light scattering portions grow greater (higher) and become narrowed in terms of their arrangement distance as they get away from LED 2. Therefore, light radiated from emitting surface 14k of the light guide unit 14 can be totally brought to uniformity. Further, diffusion plate 5 is arranged on emitting surface 14k of the light guide unit 14, and liquid crystal display element 6 is arranged on the top surface of the diffusion plate 5. Incidentally, backlight apparatus BL is provided with LED 2, light guide unit 14, and diffusion plate 5. LED 2 may be integrally attached to the light guide unit 14 as one body.

In FIGS. 22 and 23, incident section 14IN of light guide unit 14 guides light emitted from LED 2 into emitting section 14OT, and the light is projected uniformly from emitting surface 14k toward a bottom surface of liquid crystal display element 6 through diffusion plate 5.

FIG. 24 is a schematic perspective view of one incident section 14IN of light guide unit 14. In the mean time, the direction of a thickness of the light guide unit 14 is assumed to be the vertical direction (Y direction) and the direction of a width of the light guide unit 14 is assumed to be the horizontal direction (X direction), in FIG. 24. Incident section 14IN includes therein top surface 4a, base surface 4b, and side surfaces 4c and 4d. Incident section 14IN further includes incident surface 14e which intersects with the aforesaid surfaces.

In this structure, incident section 14IN and emitting section 14OT are integrally formed as one body. Therefore, emitting surface 4f of the light guide element and incident surface 3b of light guide plate 3 in the structure of FIG. 1 forms boundary surface 14f between incident section 14IN and emitting section 14OT in this structure of FIG. 24. As shown in FIG. 24, boundary surface 14f is defined as an imaginary boundary parallel to incident surface 14e, which is placed inside of the light guide unit 14.

Incident surface 14e is arranged to be in contact with or to be close to emitting surface 2a of LED 2 (see FIG. 22). Dimension D1 of incident surface 14e in the vertical direction is greater than dimension D2 of boundary surface 14f in the vertical direction, while, dimension L1 of incident surface 14e in the horizontal direction is smaller than dimension L2 of boundary surface 14f in the horizontal direction. Owing to the form stated above, the incident section 14IN can guide the light emitted from LED 2 to the thin emitting section 14OT.

Further, incident section 14IN includes a structure in a light leakage reducing shape 4M formed on top surface 14a.

In this specification, dimension D1 of incident surface 14e in the vertical direction represents a length in the vertical direction of the end at the incident surface 14e side of the incident section 14IN which does not include the structure in the light leakage reducing shape. Dimension D2 of boundary surface 14f in the vertical direction represents a length in the vertical direction of the end at the boundary surface 14f side of the incident section 14IN which does not include the structure in the light leakage reducing shape.

The light leakage reducing shape will be explained as follows.

FIG. 4 is a diagram for illustrating a light leakage reducing shape. In FIG. 4, YZ plane (imaginary plane) is set as a plane that intersects with base surface 4b of the light guide element 4 at right angles. The YZ plane is assumed to pass through the center of LED 2 in the width direction of light guide plate 3 and to extend in the direction of the thickness of light guide plate 3. In this case, top surface 4A' shown with dotted lines is assumed to be inclined to base surface 4b so that space between the top surface and the base surface becomes narrower as a position in the space moves toward the emitting surface side (rear side in FIG. 4). In such a case, the light emitted from the edge on the front side of the YZ plane travels along the YZ plane, and the light satisfies the total reflection condition as long as an incident angle is small. Therefore, the light is reflected by top surface 4A' at point A as shown with dotted line arrows, then, is reflected by base surface 4b at point B'. The reflected light travels without separated from the YZ plane even after the reflections. However, incident angle θ2' at point B is greater than incident angle θ1 at point A because top surface 4A' is inclined to the emitting surface side for base surface 4b. Therefore, if any incident angle exceeds a threshold value after repetition of reflections, the total reflection condition is lost, and it is feared that the light passes through top surface 4A' or base surface 4b to leak out to the outside.

In this case, there is considered a structure in a light leakage reduction shape, in which top surface 4A that is inclined to the emitting surface side so that space between the top surface and the base surface becomes narrower as a position in the space moves toward the emitting surface side and is further inclined to the emitting surface side so that space between the top surface and the base surface becomes narrower as a position in the space moves toward the left side surface side (see solid lines). In the example shown in FIG. 4, it is assumed that YZ plane intersects with top surfaces 4A' and 4A at the intersection position of top surfaces 4A' and 4A. In the structure, the light emitted from the edge on the front side of the YZ plane and traveling along the YZ plane is reflected by top surface 4A at point A as shown with solid line arrows, then, is reflected by base surface 4b at point B, where point B is different from point B' and the point B does not exist on the YZ plane. In other words, the light reflected by top surface 4A at point A has a component (direction component) in the X direction perpendicular to the YZ plane, and travels in the direction to be deflected away from YZ plane, to enter the point B that is away from point B'. Therefore, as far as incident angle θ1 at point A is the same between a structure using top surface 4A' and a structure using top surface 4A, incident angle θ2 at point B is smaller than incident angle θ2' at point B' in each structure. Therefore, it can be seen that the possibility of satisfying the total reflection condition is higher in the structure using top surface 4A than that in the structure using top surface 4A' even after light is repeatedly reflected in the structure.

Similarly, an embodiment using light guide unit 14 shown in FIG. 22 may includes a structure in a light leakage reduction shape, in which top surface 4A that is inclined to the base surface 4b so that the space between the top surface and the base surface becomes narrower as the point in the space goes to the side of the boundary surface 14f and is further inclined so that the space between the top surface and the base surface becomes narrower as the point in the space goes to the left side surface side. It is expected to have similar effect to the embodiment using light guide element shown in FIG. 1. In this embodiment, a plane that intersects with base surface 4b of the incident section 14IN at right angles corresponds to the plane YZ.

However, this effect is not limited to a light flux entering a light leakage reducing shape through YZ plane or through the plane that is in parallel with YZ plane, namely, it is not limited to an incident light having only components in Y direction and Z direction. The same effect can also be obtained for the incident light having a component in the X direction in addition to the components in the Y direction and Z direction. Namely, a part or the whole of the incident light flux in the Y direction are converted by the top surface 4A to X direction or Z direction, and the possibility that the light satisfies the condition of total reflection is enlarged.

As stated above, the light leakage reducing shape can display its functions only by inclining evenly any one of top surface 4a and base surface 4b of light guide element 4 (or incident section 14IN of light guide unit 14) so as to reduce the dimension in the vertical direction (height direction of side surface 4c or 4d). Further, in the present embodiment, a part of top surface 4a is deformed to provide plural pairs of elongated slopes 4g and 4h each intersecting with each other, which is called ridges or prisms, as shown in FIGS. 3 and 24. Each pair of slopes 4g and 4h, which is called the apex of the prism, forms an intersection 4i extending in the direction from the incident surface 4e to the emitting surface 4f or boundary surface 14f. Therefore, a dimension in the vertical direction of light guide element 4 and light guide unit 14 can be made small to contribute to downsizing of the backlight apparatus. Incidentally, in the present embodiment shown in FIGS. 3 to 13 and 24 to 30, the pairs of slopes 4g and 4h constitute light leakage reducing shape 4M. Incidentally, when separating surfaces 4x is formed between the plural pair of slopes 4g and 4h as will be described later, it is assumed that the separating surfaces 4x are also included in the light leakage reducing shape 4M. When tapered surfaces 4p each connected to the pair of slopes 4g and 4h is formed further as will be described later, it is assumed that the tapered surfaces 4p are also included in the light leakage reducing shape 4M, although the illustration of the foregoing is omitted in a part of the drawings.

Figure 5A:
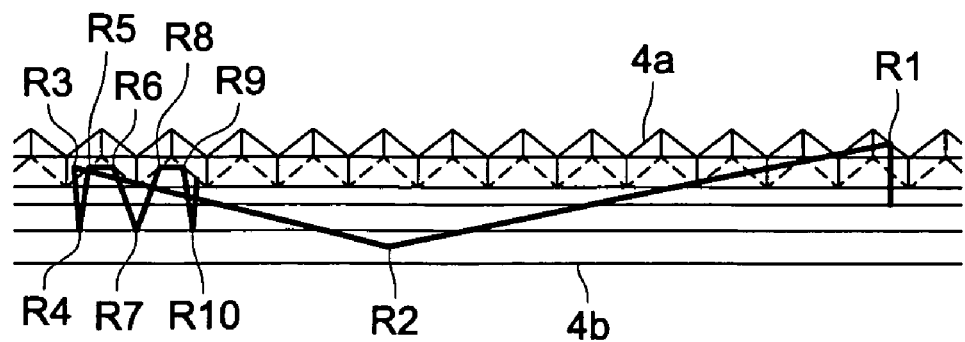
Figure 5B:
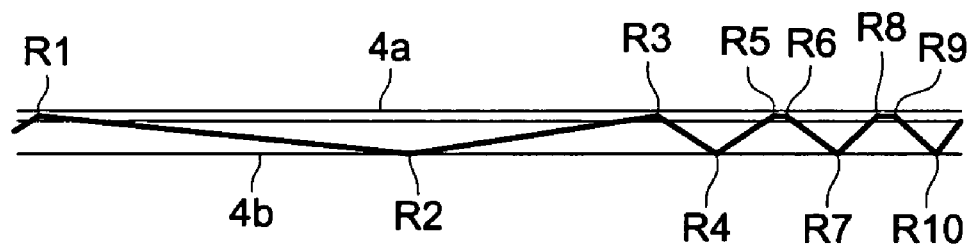

Each of FIGS. 5(a) and 5(b) is a diagram showing the results of simulations conducted by the inventor of this invention. FIG. 5(a) shows the state wherein light guide element 4 or incident section 14IN of light guide unit 14 is projected in Z axis direction in FIG. 3 or 24, and FIG. 5(b) shows the state wherein light guide element 4 or incident section 14IN of light guide unit 14 is projected in X axis direction in FIG. 3 or 24. It is understood from FIGS. 5(a) and 5(b) that the light entering into light guide element 4 or incident section 14IN of light guide unit 14 is reflected between a prism of top surface 4a and base surface 4b in the order of R1 to R10 to travel toward the emitting surface.

Now, a preferred embodiment of the light guide element 4 will be explained as follows. FIG. 6(a) is a side view of light guide element 4 from which the structure in the light leakage reducing shape is removed. FIG. 6 (b) is a top view of light guide element 4. FIG. 6(c) is a diagram of only the structure in the light leakage reducing shape which is extracted from the light guide element, and it is an enlarged diagram wherein a pair of slopes 4g and 4h are viewed in the direction toward the emitting surface side. Under the conditions that D1 represents a dimension in the height direction of the incident surface 4e, D2 represents a dimension in the height direction of the emitting surface 4f, L3 represents a distance (total length) between the incident surface 4e and the emitting surface 4f, θ1 represents an angle formed by the incident surface 4e and top surface 4a, and θ2 represents an angle formed by the incident surface 4e and base surface 4b, when an any angle smaller among θ1 and θ2 exceeds the upper limit value of the following expression (1), total length L3 of the light guide element 4 can be controlled to be small, which is preferable. While, when the angle exceeds the lower limit value, the total reflection condition becomes easy to be satisfied, which is preferable.

$$70° \leq \theta \leq 90° \quad (1)$$

Further, when an area of the incident surface 4e is greater than that of the emitting surface 4f, the light can be distributed efficiently, which is preferable. Namely, it is preferable to design light guide element 4 so that the following expression may hold when L1 represents a dimension in the width direction of the incident surface 4e and L2 represents a dimension in the width direction of the emitting surface 4f.

$$L1 \times D1 \geq L2 \times D2 \quad (2)$$

In FIG. 6(b), if angle γ, which is an angle formed by a central line of light guide element 4 and an apex of the prism forming a structure in a light leakage reducing shape, satisfies the following expression, the total reflection condition becomes easy to be satisfied, which is preferable. Incidentally, angle γ is still effective even it is 0°.

$$0° \leq \gamma \leq 40° \quad (3)$$

When angle β which is formed by slopes 4g and 4h in FIG. 6(c), is made to be the lower limit value or more of the following expression, the total reflection condition becomes easy to be satisfied, while, when it is made to be the upper limit value or less, a height of the light guide element 4 can be reduced.

$$100° \leq \beta \leq 170° \quad (4)$$

Similarly, the light guide unit shown in FIG. 22 in which incident section 14IN and emitting section 14OT are integrally formed as one body preferably provides a structure shown in FIGS. 25(a) to 25(c). FIG. 25(a) is a side view of incident section 14IN from which the structure in the light leakage reducing shape is removed. FIG. 25(b) is a top view of incident section 14IN. FIG. 25(c) is a diagram of only the structure in the light leakage reducing shape which is extracted from the incident section, and it is an enlarged diagram wherein a pair of slopes 4g and 4h are viewed in the direction toward the boundary surface side. Under the conditions that D1 represents a dimension in the height direction in the incident surface 14e, D2 represents a dimension in the height direction in the boundary surface 14f, L3 represents a distance (total length) between the incident surface 14e and the boundary surface 14f, θ1 represents an angle formed by the incident surface 14e and top surface 4a, and θ2 represents an angle formed by the incident surface 14e and base surface 4b, when an any smaller angle among θ1 and θ2 exceeds the upper limit value of the above expression (1), total length L3 of the incident section 14IN can be controlled to be small. While, when the angle exceeds the lower limit value, the total reflection condition becomes easy to be satisfied, which is preferable.

Further, when an area of the incident surface 14e is greater than that of the boundary surface 14f, the light can be distributed efficiently, which is preferable. Namely, it is preferable to design incident section 14IN so that the above expression (2) may hold when L1 represents a dimension in the width direction of the incident surface 14e and L2 represents a dimension of the width direction in the boundary surface 14f.

In FIG. 25(b), if angle γ formed by a central line of incident section 14IN and by an apex of the prism representing a structure in a light leakage reducing shape satisfies the above expression (3), the total reflection condition becomes easy to be satisfied, which is preferable. Incidentally, angle γ is still effective even it is 0°.

When angle β, which is formed by slopes 4g and 4h in FIG. 25(c), is made to be the lower limit value or more of the above expression (4), the total reflection condition becomes easy to be satisfied, while, when it is made to be the upper limit value or less, a height of the incident section 14IN can be reduced.

Each of FIGS. 7(a)-7(c) is a side view of a light guide element relating to the variations of the present embodiment. In these figures, angle θ1 is formed on the incident surface of light guide element 4 which faces the emitting surface of LED 2, between the incident surface of light guide element 4 and top surface 4a of light guide element 4, and angle θ2 is formed on the incident surface of light guide element 4 between the incident surface of light guide element 4 and base surface 4b of light guide element 4. It is possible to make angle θ1 to be different from θ2 as shown in FIG. 7(b), in addition to the occasion where angle θ1 is the same as angle θ2, as shown in FIG. 7(a). It is also possible to make angle θ1 (or θ2) to be an obtuse angle, as shown in FIG. 7(c).

Similarly, incident section 14IN of light guide unit 14 shown in FIG. 22 can provide a structure shown in FIGS. 26(a) to 26(c). In these figures, angle θ1 is formed on the incident surface of incident section 14IN facing the emitting surface of LED 2, between the incident surface of incident section 14IN and top surface 4a of incident section 14IN, and angle θ2 is formed on the incident surface of incident section 14IN between the incident surface of incident section 14IN and base surface 4b of incident section 14IN. It is possible to make angle θ1 to be different from θ2 as shown in FIG. 26(b), in addition to the occasion where angle θ1 is the same as angle θ2, as shown in FIG. 26(a). It is also possible to make angle θ1 (or θ2) to be an obtuse angle, as shown in FIG. 26(c).

Each of FIGS. 8(a)-8(e) is an enlarged diagram showing an enlarged top surface of a light guide element and an incident section of the light guide unit relating to the variation of the present embodiment. As shown in FIG. 8(a), slopes 4g and 4h may stand respectively at different angle each other as shown in FIG. 8(b) in addition to the occasion where slopes 4g and 4h stand at the same angle from a horizontal plane as shown in FIG. 8(a). Further, flat surface 4j may be arranged between adjacent prisms as shown in FIG. 8(c), and intersection 4i between slopes 4g and 4h may be made a flat surface as shown in FIG. 8(d). Further, a surface of a prism may be made a curved surface as shown in FIG. 8(e). In this case, slopes 4g and 4h can be connected smoothly at the intersection. When providing the forms of these variations, it is possible to construct so that the shape may appear from the half way in the direction of a length (direction of the depth) of light guide element 4, for example, and to construct so that plural forms may be combined from the half way by switching.

Each of FIGS. 9(a)-9(f) is a top view of a light guide element relating to the variations of the embodiment. Intersection 4i representing an apex of the prism may be inclined to the center line of light guide element 4 in different directions to be extending as shown in FIG. 9(a). Intersection 4i also may be extending to be parallel with a center line of light guide element 4 as shown in FIG. 9(b) and the intersection further may be inclined to the center line of light guide element 4 in one direction as shown in FIG. 9(c). Further, the intersection 4i may be extending radially as shown in FIG. 9(d) or extending to draw a curved line instead of a straight line. Further, side surfaces 4c and 4d of a light guide element may also be a curved surface as shown in FIGS. 9(e) and 9(f). Incidentally, dotted lines in FIGS. 9(b), 9(c) and 9(d) represent a trough portion of a prism (trough edge), and in FIG. 9(a), for example, this trough portion of a prism is omitted.

Figure 27A:
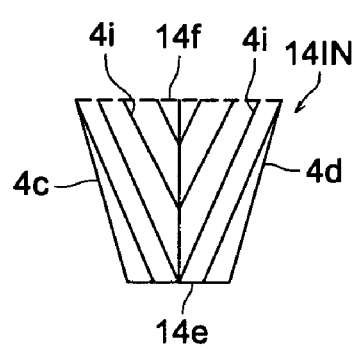
Figure 27B:
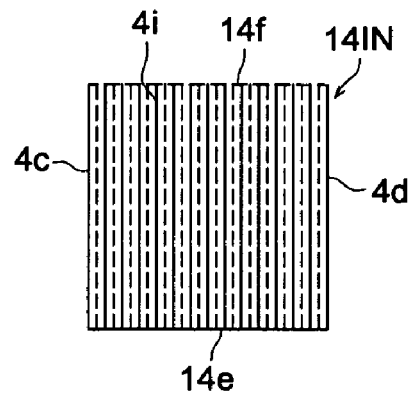
Figure 27C:
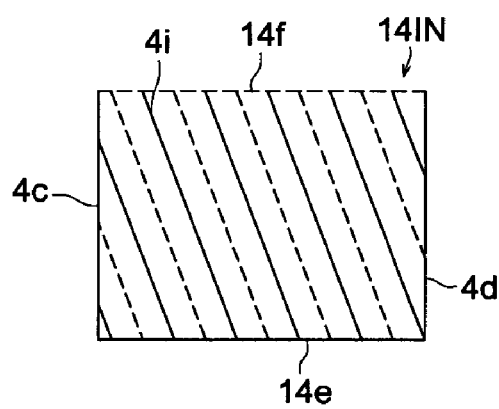
Figure 27D:
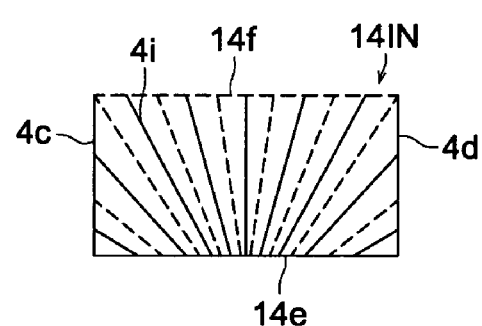
Figure 27E:
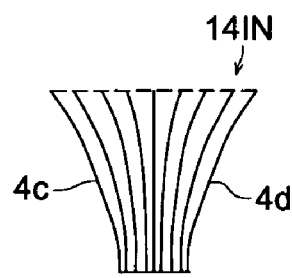
Figure 27F:
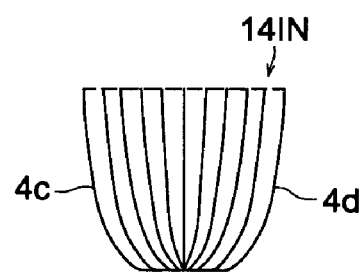

Similarly, in light guide unit 14 shown in FIGS. 22 and 23, a top of incident section 14IN may has a structure shown in FIGS. 27(a)-27(f). Intersection 4i representing an apex of the prism may be inclined to the center line of incident section 14IN in different directions to be extending as shown in FIG. 27(a). Intersection 4i also may be extending to be parallel with a center line of incident section 14IN as shown in FIG. 9(b) and the intersection further may be inclined to the center line of incident section 14IN in one direction as shown in FIG. 27(c). Further, the intersection 4i may be extending radially as shown in FIG. 27(d) or extending to draw a curved line instead of a straight line. Further, side surfaces 4c and 4d of an incident section may also be a curved surface as shown in FIGS. 27(e) and 27(f). Incidentally, dotted lines in FIGS. 27(b), 27(c) and 27(d) represent a trough portion of a prism (trough edge), and in FIG. 27(a), for example, this trough portion of a prism is omitted.

Second Embodiment

FIG. 10 is a perspective view of a light guide element relating to the second embodiment, and FIG. 11 is a top view of the light guide element shown in FIG. 10. In FIG. 10, in the same way, the direction of a thickness of the light guide plate 3 is assumed to be the vertical direction (Y direction) and the direction of a width of the light guide plate 3 is assumed to be the horizontal direction (X direction). Light guide element 4 is made integrally of transparent resins such as PC, PMMA and cycloolefin polymer as one body and has therein top surface 4a, base surface 4b, side surfaces 4c and 4d. Light guide element 4 further includes incident surface 4e and emitting surface 4f which intersect with the aforesaid surfaces. Further, a part of top surface 4a is deformed, to provide plural pairs of elongated slopes 4g and 4h each intersecting with each other (which are called ridges or prisms), and intersection 4i (which is called the apex of the prism) of the each pair of slopes 4g and 4h extending in the direction from the incident surface 4e toward the emitting surface 4f. Further, an intersection of adjacent paired slopes 4h and 4g is prescribed as trough edge 4j.

Incident surface 4e is arranged to be in contact with or to be close to emitting surface 2a of LED 2 (see FIG. 1), while, emitting surface 4f is arranged to be in contact with or to be close to incident surface 3b of light guide plate 3 (see FIG. 1). Dimension D1 in the vertical direction of side surfaces 4c and 4d on the incident surface 4e side, is greater than dimension D2 in the vertical direction on the emitting surface 4f side, while, dimension L1 of incident surface 4e in the horizontal direction is smaller than dimension L2 of emitting surface 4f in the horizontal direction. In addition, distance W1 between adjacent intersections 4i on the incident surface 4e side is smaller than distance W2 between adjacent intersections 4i on the emitting surface 4f side. The number of ridges on the incident surface 4e side is the same as that of ridges on the emitting surface 4f side. Incidentally, in the present embodiment, the pair of slopes 4g and 4h forming a light leakage reducing shape has a dimension in the direction of a thickness of light guide plate 3 gradually increasing in the direction from incident surface 4e side toward emitting surface 4f side.

When β represents an angle formed by a pair of slopes 4g and 4h at intersection 4i in FIG. 10, the following conditional expression (4) is satisfied.

$$100° \leq \beta \leq 170° \tag{4}$$

The form stated above allows to easily control the direction of traveling of the light entering the incident surface 4e, and to control various characteristics such as illuminance distribution and luminance distribution at emitting surface 4f to achieve desired purpose. Thus, illuminance unevenness at emitting surface 4f can be reduced. It is further possible to enhance the utilization efficiency of light because it is easy for the light entering through incident surface 4e to satisfy the total reflection condition.

Alternatively, the above embodiment may also provide a light guide unit including incident section 14IN and emitting section 14OT, which are integrally formed as one body, as shown in FIGS. 28 and 29.

FIG. 28 is a perspective view of an incident section relating to the present embodiment, and FIG. 29 is a top view of the incident section shown in FIG. 28. In FIG. 28, in the same way, the direction of a thickness of the light guide unit 14 is assumed to be the vertical direction (Y direction) and the direction of a width of the light guide unit 14 is assumed to be the horizontal direction (X direction). Incident section 14IN is made integrally of transparent resins such as PC, PMMA and cycloolefin polymer as one body and has therein top surface 4a, base surface 4b, side surfaces 4c and 4d. Incident section 14IN further includes incident surface 14e and boundary surface 14f which intersect with the aforesaid surfaces. In this structure, boundary surface 14f is defined as an imaginary boundary parallel to incident surface 14e, which is placed inside of the light guide unit 14. Further, a part of top surface 4a is deformed, to provide plural pairs of elongated slopes 4g and 4h each intersecting with each other (which are called ridges or prisms), and intersection 4i (which is called the apex of the prism) of the plural pairs of slopes 4g and 4h extending in the direction from the incident surface 14e toward the boundary surface 14f. Further, an intersection of adjacent paired slopes 4h and 4g is prescribed as trough edge 4j.

Incident surface 14e is arranged to be in contact with or to be close to emitting surface 2a of LED 2 (see FIG. 22). Dimension D1 in the vertical direction of side surfaces 4c and 4d on the incident surface 14e side, is greater than dimension D2 in the vertical direction on the boundary surface 14f side, while, dimension L1 of incident surface 14e in the horizontal direction is smaller than dimension L2 of boundary surface 14f in the horizontal direction. In addition, distance W1 between adjacent intersections 4i on the incident surface 14e side is smaller than distance W2 between adjacent intersections 4i on the boundary surface 14f side. The number of ridges on the incident surface 14e side is the same as that of ridges on the emitting surface 14f side. Incidentally, in the present embodiment, a pair of slopes 4g and 4h forming a light leakage reducing shape has a dimension in the direction of a thickness of light guide unit 14 gradually increasing in the direction from incident surface 4e side toward boundary surface 14f side.

When β represents an angle formed by a pair of slopes 4g and 4h at intersection 4i in FIG. 28, the above conditional expression (4) is satisfied.

The form stated above allows to easily control the direction of traveling of the light entering the incident surface 14e, and to control various characteristics such as illuminance distribution and luminance distribution at boundary surface 14f to achieve desired purpose. Thus, illuminance unevenness at boundary surface 14f can be reduced. It is further possible to enhance the utilization efficiency of light because it is easy for the light entering through incident surface 14e to satisfy the total reflection condition.

FIG. 12 is a diagram showing the results of simulations conducted by the inventor of this invention. FIG. 12 shows the results of an example wherein angle θ1 formed by the incident surface and a top surface is made to be 89.6° as an example of a range satisfying $70° < θ1 < 90°$, and apical angle β of a prism representing a structure in a light leakage reducing shape is changed from 90° to 180° when constituting a light guide element or light guide unit by using a resin material having a refractive index of 1.525, in embodiments shown in FIGS. 10, 11, 28, and 29. Incidentally, apical angle β is 180° means that a structure in a light leakage reducing shape by a prism does not exist, and a top surface is a flat surface. In FIG. 12, a vertical axis represents a utilization efficiency of light, and a horizontal axis represents apical angle β of a prism. The results shown in FIG. 12 make it possible to secure the utilization efficiency of light at 0.44 or more in a range of β from 100° to 170°. It is further possible to secure the utilization efficiency of light at 0.52 or more in a range of β from 116° to 165°.

Third Embodiment

In some cases, relatively thin light guide plate 3 is used in a backlight apparatus using light guide element 4. However, if emitting surface 4f of light guide element 4 is made to be thin, to fit to a thickness of incident surface 3b of light guide plate 3, intensity of light guide element 4 becomes insufficient, resulting in a fear of bending and snapping. There is further caused a problem of molding failure caused by the decline of rigidity. Therefore, for securing the intensity of light guide element 4 on the emitting surface 4f side, top surface 4a side of the emitting surface 4f is sometimes arranged to be protruded from incident surface 3b of light guide plate 3.

In this case, as shown in FIG. 13, the light traveling through light guide element 4 passes through a protruded part of the emitting surface 4f and enters into the side face of diffusion plate 5 which is positioned on the upper part of light guide plate 3. It causes a fear that intensity distribution of light emerging from the diffusion plate 5 becomes uneven.

Similarly, relatively thin emitting section 14OT of light guide unit 14 is sometimes required for a backlight apparatus using light guide unit 14. However, if incident section 14IN is made to be thin, to fit to a thickness of incident surface emitting section 14OT, thickness around trough portions of slopes 4g and 4h becomes substantially zero. Therefore, strength of light guide unit 14 becomes insufficient, resulting in a fear of bending and snapping. There is further caused a problem of molding failure caused by the decline of rigidity. Therefore, for securing the strength of light guide unit 14, boundary surface 14f side of the incident section 14IN is sometimes formed so as to be protruded from boundary surface 14f side of emitting section 14OT.

In this case similarly, as shown in FIG. 30, the light traveling through incident section 14IN passes through a protruded part of the end surface of incident section 14IN and enters into the side face of diffusion plate 5 which is positioned on the upper part of emitting section 14OT. It causes a fear that intensity distribution of light emerging from the diffusion plate 5 becomes uneven. In the following embodiment, the troubles of this kind can be relieved or dissolved.

FIG. 14 is a perspective view showing light guide element 4 and light guide plate 3 relating to the third embodiment, and it shows the assembled state. In the third embodiment, when the vertical direction is represented by the direction of a thickness, thickness T2 of incident surface 3b of light guide plate 3 is thinner than maximum thickness T1 of the end surface at the emitting surface 4f side of light guide element 4, which includes the structure in the light leakage reducing shape. Dimension D2 in the vertical direction on the end surface at the emitting surface 4f side of the light guide element is smaller than thickness T2 of incident surface 3b of light guide plate 3. Therefore, a part of a ridged portion (namely, a part of the structure in the light leakage reducing shape) formed by slopes 4g and 4h at the emitting surface 4f side of light guide element 4 protrudes upward from incident surface 3b.

In this embodiment, the whole of the ridged portion (namely, whole of the structure in the light leakage reducing shape) may protrude from the incident surface 3b, wherein the whole of the ridged portion represents an area from the peak of the ridged portion which is formed by slopes 4g and 4h to intersection lines 4m and 4n where two slopes 4h and 4g intersect with the separating surfaces 4x respectively. However, an embodiment in which at least a part of the structure in the light leakage reducing shape protrudes from the incident surface 3b has enough effect according to the present invention.

Further, the present embodiment provides separating surfaces 4x each forming a flat surface which extends between two slopes 4h and 4g forming a trough among plural pairs of slopes and extends along base surface 4b. Each of the separating surfaces 4x forms intersection lines 4m and 4n with two slopes 4h and 4g respectively, and the interval between the intersection lines 4m and 4n gradually increases in the direction from incident surface 4e side to emitting surface 4f side, which makes manufacturing to be easy. Namely, each of the separating surfaces 4x has a triangular shape when it is viewed from the top. Further, each of the separating surfaces 4x is formed to touch the emitting surface 4f but not to touch the incident surface 4e. Incidentally, it is preferable that each of the separating surface 4x comes to an end in the incident surface 3b. Since the separating surfaces 4x are formed, dimensions of slopes 4g and 4h, which form the structure in the light leakage reducing shape, in the direction of a thickness of light guide plate 3 grow greater gradually, and then, become smaller gradually, in the direction from incident surface 4e side to emitting surface 4f side (see FIG. 15). Since angle β formed by the paired slopes 4g and 4h is constant for the total length of intersection 4i, the manufacturing is easy. With respect to structures other than the foregoing, their explanation will be omitted, because they are the same as those of the embodiment shown in FIG. 10. In the present embodiment shown in FIGS. 14-16, a plural pair of slopes 4g and 4h and the separating surfaces 4x form the structure in the light leakage reducing shape 4M.

FIG. 15 is a diagram giving a view of the embodiment shown in FIG. 14 from the side. In the present embodiment, when light enters into incident surface 4e of light guide 4, separating surfaces 4x conduct total reflection to a part of the light which passes through the vicinity of top surface 4a among the incident light. It deflects the light so as to pass through incident surface 3b of light guide plate 3. Owing to this, this embodiment provides the protruded area at emitting surface 4f side of the structure in the light leakage reducing shape which is protruded from incident surface 3b, and it can control the light leaking out from the protruded area to the outside of the light guide plate 3.

Similarly, the light guide unit in which incident section 14IN and emitting section 14OT are integrally formed as one body preferably provides a structure shown in FIG. 14. FIG. 31 is a perspective view showing light guide unit 14 relating to the present embodiment. In the present embodiment, when the vertical direction is represented by the direction of a thickness, thickness T2 of the end surface at the boundary surface 14f side of incident section 14IN is thinner than maximum thickness T1 of incident section 14IN at the boundary surface 14f side (namely, the maximum thickness of emitting section 14OT) which includes the structure in the light leakage reducing shape. Dimension D2 in the vertical direction of the end surface at the boundary surface 14f side of the incident section 14IN is smaller than thickness T2 of the end surface at the boundary surface 14f side of emitting section 14OT. Therefore, a part of a ridged portion (namely, a part of the structure in the light leakage reducing shape) formed by slopes 4g and 4h neighboring boundary surface 14f is protruded upward from boundary surface 14f.

In this embodiment, the whole of the ridged portion (namely, whole of the structure in the light leakage reducing shape) may protrude from the boundary surface 14f, wherein the whole of the ridged portion represents an area from its peak which is formed by slopes 4g and 4h to intersection lines 4m and 4n where two slopes 4h and 4g intersect with the separating surfaces 4x respectively. However, an embodiment in which at least a part of the structure in the light leakage reducing shape protrudes from the boundary surface 14f has enough effect according to the present invention.

Further, the present embodiment provides separating surfaces 4x each forming a flat surface which extends between two slopes 4h and 4g forming a trough among plural pairs of slopes and extends along base surface 4b. Each of the separating surfaces 4x forms intersection lines 4m and 4n with two slops 4h and 4g respectively, and the interval between the intersection lines 4m and 4n gradually increases in the direction from incident surface 4e side to emitting surface 4f side, which makes manufacturing to be easy. Namely, each of the separating surfaces 4x has a triangular shape when it is viewed from the top. Further, each of the separating surfaces 4x is formed to touch the boundary surface 14f but not to touch the incident surface 14e. Since the separating surfaces 4x are formed, dimensions of slopes 4g and 4h, which form the structure in the light leakage reducing shape, in the direction of a thickness of light guide unit 14 grow greater gradually, and then, become smaller gradually, in the direction from incident surface 14e side to boundary surface 14f side (see FIG. 32). Since angle β formed by the paired slopes 4g and 4h is constant for the total length of intersection 4i, the manufacturing is easy. With respect to structures other than the foregoing, their explanation will be omitted, because they are the same as those of the embodiment shown in FIG. 28. In the present embodiment shown in FIGS. 31-32, a plural pair of slopes 4g and 4h and the separating surfaces 4x constitute the structure in the light leakage reducing shape 4M.

FIG. 32 is a diagram giving a view of the embodiment shown in FIG. 31 from the side. In the present embodiment, when light enters into incident section 14IN, separating surfaces 4x conduct total reflection to a part of the light which passes through the vicinity of top surface 4a among the incident light. It deflects the light so as to pass through boundary section 14f. Owing to this, it can control the light leaking out from an end touching to boundary surface 14f of incident section 14IN to the outside of the light guide unit 14.

FIG. 16 is a graph showing the results of simulations conducted by the inventor of this invention, and a vertical axis represents a rate of leakage of light and a horizontal axis represents T1/T2 where T1 is the maximum thickness of the end surface at emitting surface side of light guide element which includes the structure in the light leakage reducing shape, and T2 is a thickness of the incident surface of the light guide plate. The inventor of this invention studied by changing an inclination angle of the separating surfaces 4x to a horizontal plane (a plane extending parallel with a base surface of light guide plate 3, in this case) to 0°, 0.1°, 0.2° and 0.3°, and found out that the rate of leakage of light is increased as T1/T2 grows greater under the any conditions. Incidentally, in the results of other studies, it was found that the utilization efficiency of light is enhanced when a value of T1/T2 is in a range of 1.1-1.5.

Further, light guide unit 14 shown in FIGS. 31 and 32 shows similar characteristics to the embodiment shown in FIG. 16. For this embodiment, in FIG. 16, a vertical axis represents a rate of leakage of light and a horizontal axis represents T1/T2 where T1 is a thickness of the end surface at the boundary surface side of the incident section which includes the structure in the light leakage reducing shape, and T2 is a thickness of the boundary surface side of the emitting section.

Fourth Embodiment

FIG. 17 is a perspective view showing light guide element 4 and light guide plate 3 relating to the fourth embodiment, and it shows the assembled state. The present embodiment provides tapered surfaces 4p each intersecting with two slopes 4g and 4h which forms a ridge among plural pairs of slopes provided. Each of tapered surfaces 4p comes in contact with emitting surface 4f inclining toward incident surface 4e at a prescribed angle with emitting surface 4f. These tapered surfaces 4p can be formed by cutting off plural pairs of slopes 4g and 4h collectively by imaginary plane Q tilted from emitting surface 4f by angle δ, and it is also possible to make each tapered surface 4p to be different in terms of its angle of inclination. Meanwhile, in the present embodiment, thickness T1 of the end surface at the emitting surface 4f side of light guide element 4 and a thickness of incident surface 3b of light guide plate 3 are arranged to be the same to each other. The tapered surface 4p makes dimensions of slopes 4g and 4h, which forms the structure in the light leakage reducing shape, in the direction of a thickness of light guide plate 3 grow greater gradually, and then, become smaller gradually, toward emitting surface 4f from incident surface 4e (see FIG. 18). Angle β formed by a pair of slopes 4g and 4h is constant for the total length of intersection 4i. With respect to structures other than the foregoing, their explanation will be omitted, because they are the same as those of the embodiment shown in FIG. 10. In the present embodiment shown in FIGS. 17-19, a pair of slopes 4g and 4h and the tapered surface 4p form the structure in the light leakage reducing shape 4M.

FIG. 18 is a diagram giving a view of the embodiment shown in FIG. 17 from the side. In the present embodiment, when light enters through incident surface 4e of light guide element 4, a part of the light passing through the vicinity of top surface 4a among the incident light is subjected to total reflection on the tapered surface 4p and is oriented so as to pass through incident surface 3b of light guide plate 3. Owing to this, the light leaking out from the surface other than the emitting surface 4f to the outside of the light guide plate 3 can be controlled. In the mean time, separating surfaces 4x shown in each of FIGS. 14 and 15 may also be added to the present embodiment.

Figure 19A:
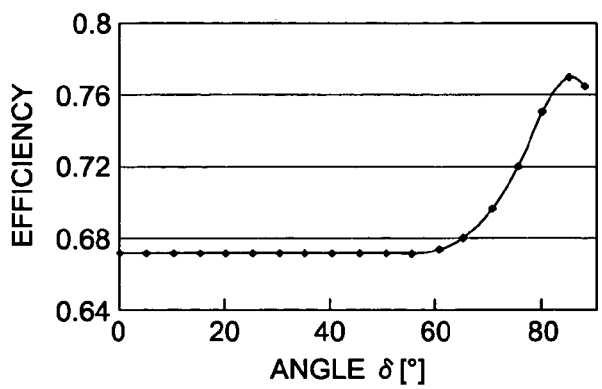
Figure 19B:
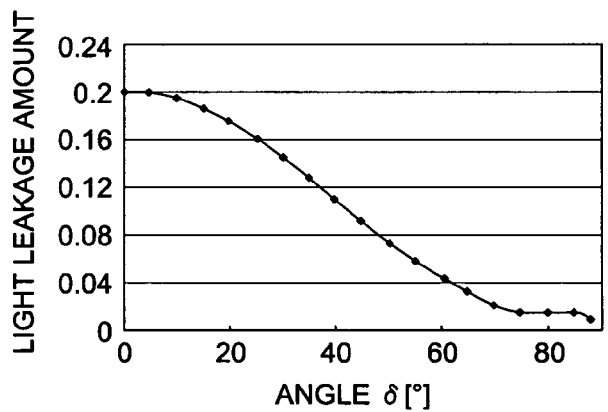

Each of FIGS. 19(a) and 19(b) is a graph showing the results of simulations conducted by the inventor of this invention. In FIG. 19(a), the utilization efficiency of light is represented by a vertical axis, and angle β which is formed by a tapered surface of the light guide element and a emitting surface shown in FIG. 18, is represented by a horizontal axis. In FIG. 19(b), the rate of leakage of light is represented by a vertical axis, and angle β formed by a tapered surface and an emitting surface of the light guide element is represented by a horizontal axis. As is apparent from FIGS. 19(a) and 19(b), it was found that the rate of leakage of light is lowest, and the utilization efficiency of light is highest in the range of 75°-85° for tapered surface 4p.

Alternatively, an embodiment of the present invention may also provide a light guide unit 14 shown in FIGS. 33 and 34. FIG. 33 is a perspective view showing light guide unit 14 relating to still another embodiment. Light guide unit 14 of the present embodiment provides tapered surfaces 4p each intersecting with two slopes 4g and 4h which forms a ridge among plural pairs of slopes. Each of tapered surfaces 4p comes in contact with boundary surface 14f to inclines toward incident surface 14e at a prescribed angle with boundary surface 14f. These tapered surfaces 4p can be formed by cutting off plural pairs of slopes 4g and 4h collectively by imaginary plane Q tilted from boundary surface 14f by angle δ, and it is also possible to make each tapered surface 4p to be different in terms of its angle of inclination. Meanwhile, in the present embodiment, thickness T1 of the end surface at the boundary surface 4f side of incident section 14IN and thickness of boundary surface 14f side end of emitting section 14OT are arranged to be the same each other. Similarly to the second embodiment providing the light guide element, because of the tapered surface 4p formed, dimensions of slopes 4g and 4h, which form the structure in the light leakage reducing shape, in the direction of a thickness of light guide unit 14 grow greater gradually, and then, become smaller gradually, toward boundary surface 14f from incident surface 14e (see FIG. 34). Angle β formed by a pair of slopes 4g and 4h is constant for the total length of intersection 4i. With respect to structures other than the foregoing, their explanation will be omitted, because they are the same as those of the embodiment shown in FIG. 28. In the present embodiment shown in FIGS. 33 and 34, a plural pair of slopes 4g and 4h and the tapered surfaces 4p form the structure in the light leakage reducing shape 4M.

FIG. 34 is a diagram giving a view of the embodiment shown in FIG. 33 from the side. In the present embodiment, when light enters through incident surface 14e of incident section 14IN, a part of the light passing through the vicinity of top surface 4a among the incident light is subjected to total reflection on the tapered surface 4p and is oriented so as to pass through boundary surface 14f. Owing to this, the light leaking out from the surface other than the boundary surface 14f to the outside of the light guide plate 3 can be controlled.

Further, light guide unit 14 shown in FIGS. 33 and 34 provides similar characteristics to embodiment of FIGS. 19(a) and 19(b). In FIG. 19(a), the utilization efficiency of light is represented by a vertical axis, and angle β which is formed by a tapered surface and a boundary surface of the incident section 14IN in FIG. 33 is represented by a horizontal axis. In FIG. 19(b), the rate of leakage of light is represented by a vertical axis, and angle β which is formed by a tapered surface and a boundary surface of the incident section is represented by a horizontal axis.

FIG. 20 is a side view of light guide element 4 relating to variations of the first to fourth embodiments. As shown in FIG. 20, slopes 4g and 4h which forms the structure in the light leakage reducing shape may also be provided on top surface 4a on the emitting surface 4e side, and they may be provided on base surface 4b on the incident surface 4f side. In this case, it is preferable that the slopes 4g and 4h on the top surface 4a side and slopes 4g and 4h on the base surface 4b side do not overlap each other in vertical direction.

Figure 21A:
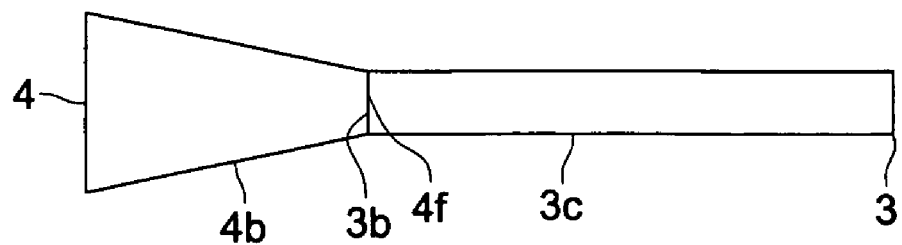
Figure 21B:
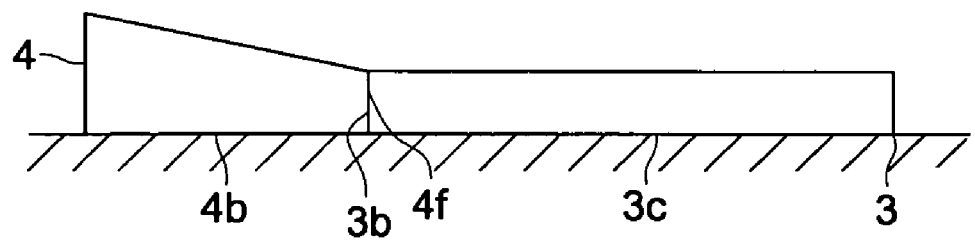

Each of FIGS. 21(a) and 21(b) is a side view of light guide element 4 and light guide plate 3 relating to variations of the first to fourth embodiments. As shown in FIG. 21(a), light guide element 4 and light guide plate 3 are assembled so that emitting surface 4f of light guide element 4 and incident surface 3b of light guide plate 3 adhere closely to each other. In this structure shown in FIG. 21(a), when base surface 4b of light guide element 4 is arranged to be tilted to base surface 3c of light guide plate 3, an amount of light taken in from incident surface 3b is increased, and utilization efficiency of light is enhanced.

On the other hand, a structure shown in FIG. 21(a) has a structure in which light guide element 4 and light guide plate 3 are assembled so that emitting surface 4f of light guide element 4 and incident surface 3b of light guide plate 3 adhere closely to each other. In this structure, when base surface 4b of light guide element 4 is arranged to be on the same plane on which the base surface 3c of light guide plate 3 is arranged, easy assembling is attained.

Further, the light guide unit in which incident section 14IN and emitting section 14OT are integrally formed as one body may provide the similar structure. Each of FIGS. 36(a) and 36(b) is a side view of light guide unit 14 relating to variations of the first to fourth embodiments. As shown in FIG. 36(a), when base surface 4b of incident section 14IN is arranged to be tilted to base surface 4s of emitting section 14OT, an amount of light taken in through boundary surface 14f into emitting section OT increased, and utilization efficiency of light is enhanced.

On the other hand, when the base surface 4b of the incident section 14IN is arranged so as to form a same plane to the base surface 4s of the emitting section 14OT, easy assembling is attained.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein. For example, a prism may either be provided only on base Surface 4b, or be formed on each of top surface 4a and base Surface 4b. Further, it is also possible to make top surface 4a and/or base surface 4b to be in a flat surface, and to stick a sheet on which a prism is formed on the flat surface.

What is claimed is:

1. A light guide element for being arranged between a light source and a light guide plate and for guiding a light flux from the light source into the light guide plate, the light guide element comprising:

an incident surface for receiving an incident light flux from the light source;

an emitting surface for emitting a light flux to the light guide plate;

a top surface and a base surface both extending in a direction to intersect with the incident surface and the emitting surface and facing each other, wherein one of the top surface and the base surface inclines to the other so that a dimension of the emitting surface along a thickness of the light guide plate becomes smaller than a dimension of the incident surface along the thickness of the light guide plate; and a structure in a light leakage reducing shape including a plurality of reflection surfaces arranged on at least one of the top surface and the base surface, wherein when an incident light flux emitted from the light source travels along a plane extending in a direction from the incident surface to the emitting surface and further extending along the thickness of the light guide plate, the plurality of reflection surfaces provide the light flux traveling along the plane with a direction component so as to deflect away from the plane.

2. The light guide element of claim 1,
wherein the light leakage reducing shape comprises a plurality of ridges extending in a direction from the incident surface to the emitting surface and formed of the plurality of reflection surfaces.

3. The light guide element of claim 2,
wherein the light leakage reducing shape comprises plural pairs of slopes, and
each pair of the slopes forms an intersection extending in a direction from the incident surface to the emitting surface.

4. The light guide element of claim 1, further comprising a pair of side surfaces facing each other and both extending in a direction to intersect with the incident surface and the emitting surface,
wherein an interval between the pair of side surfaces at a position closer to the emitting surface is wider than that at a position closer to the incident surface.

5. The light guide element of claim 3 satisfying $$100° \leq \beta \leq 170°,$$

where $\beta$ is an angle formed between the each pair of slopes at the intersection.

6. The light guide element of claim 3,
wherein the each pair of slopes forms the intersection at a constant angle over a whole length of the intersection.

7. The light guide element of claim 1, further comprising a pair of side surfaces facing each other and extending in a direction to intersect with the incident surface and the emitting surface,
wherein an interval between the pair of side surfaces at a position closer to the emitting surface is wider than that at a position closer to the incident surface, and
wherein the light leakage reducing shape comprises plural pairs of slopes,
each pair of slopes forms an intersection extending in a direction from the incident surface to the emitting surface, and
an interval between neighboring intersections at a position closer to the incident surface is smaller than that at a position closer to the emitting surface.

8. The light guide element of claim 7, satisfying $$100° \leq \beta \leq 170°,$$

where $\beta$ is an angle formed between the each pair of slopes at the intersection.

9. The light guide element of claim 7,
wherein the each pair of slopes forms the intersection at a constant angle over a whole length of the intersection.

10. The light guide element of claim 1,
wherein a dimension of the emitting surface along a thickness of the light guide plate is smaller than a thickness of an incident surface of the light guide plate.

11. The light guide element of claim 1,
wherein the structure in the light leakage reduction shape has a dimension along a thickness of the light guide plate gradually increasing in a direction from the incident surface to the emitting surface.

12. The light guide element of claim 1,
wherein the structure in the light leakage reduction shape has a dimension along a thickness of the light guide plate gradually increasing and then gradually decreasing in a direction from the incident surface to the emitting surface.

13. The light guide element of claim 1,
wherein the light leakage reducing shape comprises
plural pairs of slopes, wherein each pair of slopes forms an intersection extending in a direction from the incident surface to the emitting surface; and
a plurality of separation surfaces each extending along the base surface and each arranged at an emitting-surface side of the light guide element between two adjacent slopes which form a trough.

14. The light guide element of claim 13,
wherein each of the two adjacent slopes intersects with one of the plurality of separation surfaces at an intersection line, and
an interval between the intersection lines of the two adjacent slopes gradually increases in a direction from the incident surface to the emitting surface.

15. The light guide element of claim 13,
wherein each of the plurality of separating surfaces comes in contact with the emitting surface and does not come in contact with the incident surface.

16. The light guide element of claim 13,
wherein the each pair of slopes forms the intersection at a constant angle over a whole length of the intersection.

17. The light guide element of claim 1,
wherein the light leakage reducing shape comprises
plural pairs of slopes, wherein each pair of the slopes forms an intersection extending in a direction from the incident surface to the emitting surface; and
a plurality of tapered surfaces each intersecting with two neighboring slopes forming a ridge, each coming in contact with the emitting surface, and each inclining to the incident surface at a predetermined angle with the emitting surface.

18. The light guide element of claim 17,
wherein the each pair of slopes forms the intersection at a constant angle over a whole length of the intersection.

19. The light guide element of claim 1,
wherein the light guide element is attached to the light guide plate with the top surface and the base surface of the light guide element inclining to a base surface of the light guide plate.

20. The light guide element of claim 1,
wherein the light guide element is attached to the light guide plate with the base surface of the light guide element forming a same plane to the base surface of the light guide plate.

21. The light guide element of claim 1, comprising
a plurality of incident surfaces.

22. The light guide element of claim 1,
wherein the light source is LED.

23. A backlight apparatus for being arranged between a light source and a liquid crystal element, the backlight apparatus comprising:
a light guide element for receiving an incident light flux from the light source; and
a light guide plate emitting a light flux from the light guide element to the liquid crystal element,
wherein the light guide element comprises:
an incident surface for receiving an incident light flux from the light source;
an emitting surface for emitting a light flux to the light guide plate;
a top surface and a base surface both extending in a direction to intersect with the incident surface and the emitting surface and facing each other, wherein one of the top surface and the base surface inclines to the other so that a dimension of the emitting surface along a thickness of the light guide plate becomes smaller than a dimension of the incident surface along the thickness of the light guide plate; and
a structure in a light leakage reducing shape including a plurality of reflection surfaces arranged on at least one of the top surface and the base surface, wherein when an incident light flux emitted from the light source travels along a plane extending in a direction from the incident surface to the emitting surface and further extending along the thickness of the light guide plate, the plurality of reflection surfaces provide the light flux traveling along the plane with a direction component so as to deflect away from the plane.

24. A light guide unit comprising:
an incident section for receiving an incident light flux from a light source; and
an emitting section for emitting the incident light flux outside of the light guide unit,
wherein the incident section and the emitting section are integrally formed in one body,
the incident section is the light guide element of claim 1, and
the emitting section comprises an incident surface and an emitting surface extending in a direction perpendicular to the incident surface of the emitting section.

25. A backlight apparatus comprising the light guide unit of claim 24.

26. A backlight apparatus comprising:
an incident section for receiving an incident light flux from a light source; and
an emitting section for emitting the incident light flux outside of the backlight apparatus,
wherein the incident section and the emitting section are integrally formed in one body,
the incident section is the light guide element of claim 1, and
the emitting section comprises an incident surface and an emitting surface extending in a direction perpendicular to the incident surface of the emitting section.

27. A light source apparatus for a light guide plate comprising:
a light source; and
a light guide element arranged between the light source and the light guide plate, for guiding a light flux from the light source into the light guide plate,
wherein the light source is attached to the light guide element to form one body, and
wherein the light guide element comprises:
an incident surface for receiving an incident light flux from the light source;
an emitting surface for emitting a light flux to the light guide plate;
a top surface and a base surface both extending in a direction to intersect with the incident surface and the emitting surface and facing each other, wherein one of the top surface and the base surface inclines to the other so that a dimension of the emitting surface along a thickness of the light guide plate becomes smaller than a dimension of the incident surface along the thickness of the light guide plate; and
a structure in a light leakage reducing shape including a plurality of reflection surfaces arranged on at least one of the top surface and the base surface, wherein when an incident light flux emitted from the light source travels along a plane extending in a direction from the incident surface to the emitting surface and further extending along the thickness of the light guide plate, the plurality of reflection surfaces provide the light flux traveling along the plane with a direction component so as to deflect away from the plane.

* * * * *